(12) United States Patent
Jones et al.

(10) Patent No.: US 7,827,546 B1
(45) Date of Patent: **\*Nov. 2, 2010**

(54) MECHANISM FOR DOWNLOADING SOFTWARE COMPONENTS FROM A REMOTE SOURCE FOR USE BY A LOCAL SOFTWARE APPLICATION

(75) Inventors: Brian Jones, Redmond, WA (US); Robert Little, Redmond, WA (US); Jeff Reynar, New York, NY (US); Paul Broman, Maitland, FL (US)

(73) Assignee: Microsoft Corporation, Redmond, WA (US)

( \* ) Notice: Subject to any disclaimer, the term of this patent is extended or adjusted under 35 U.S.C. 154(b) by 612 days.

This patent is subject to a terminal disclaimer.

(21) Appl. No.: 10/731,899

(22) Filed: Dec. 9, 2003

Related U.S. Application Data

(63) Continuation-in-part of application No. 10/164,260, filed on Jun. 5, 2002.

(51) Int. Cl.
*G06F 9/44* (2006.01)
(52) U.S. Cl. ...................... 717/173; 717/168
(58) Field of Classification Search ......... 717/168–178; 715/705, 708–715; 434/322, 365
See application file for complete search history.

(56) References Cited

U.S. PATENT DOCUMENTS

| | | | |
|---|---|---|---|
| 4,674,065 A | 6/1987 | Lange et al. | 382/311 |
| 4,868,750 A | 9/1989 | Kucera et al. | 711/2 |
| 5,020,019 A | 5/1991 | Ogawa | 707/5 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 715/540 |

(Continued)

FOREIGN PATENT DOCUMENTS

CA    2 246 920 A1    3/2000

(Continued)

OTHER PUBLICATIONS

Fernandex M. et al., "SilkRoute: Trading Between Relations and XML", *Computer Networks*, Elsevier Science Publishers B.V., Amsterdam NL, vol. 33, No. 1-6, Jun. 2000, pp. 723-745.

(Continued)

*Primary Examiner*—Wei Y Zhen
*Assistant Examiner*—Qing Chen
(74) *Attorney, Agent, or Firm*—Merchant & Gould

(57) ABSTRACT

Methods and systems are provided for dynamically configuring document solutions and for obtaining desired or required components of such document solutions for use with computer-generated documents. If a document is associated with a document solution, a request for components of the solution is sent to a manifest of document solutions. Identification of a user of the document is also passed to the manifest. At the manifest, identification information for the user is used to query a user database to determine a profile of the user such as the user's job description, location, security clearance, and the like. Based on the user's profile, the document solution is configured dynamically to include solution components most helpful to the particular user. A manifest collection is provided for serving as a repository of document solution location information for many different namespaces (schemas) that may be associated with one or more user documents.

13 Claims, 8 Drawing Sheets

U.S. PATENT DOCUMENTS

| | | | |
|---|---|---|---|
| 5,287,448 A * | 2/1994 | Nicol et al. .................. 715/707 |
| 5,297,039 A | 3/1994 | Kanaegami et al. ............ 707/5 |
| 5,317,546 A | 5/1994 | Balch et al. .................... 368/9 |
| 5,337,233 A | 8/1994 | Hofert et al. ................ 715/540 |
| 5,341,293 A | 8/1994 | Vertelney et al. ............ 715/530 |
| 5,351,190 A | 9/1994 | Kondo .......................... 704/8 |
| 5,386,564 A | 1/1995 | Shearer et al. ............... 395/650 |
| 5,392,386 A | 2/1995 | Chalas ....................... 715/841 |
| 5,418,902 A | 5/1995 | West et al. .................. 715/503 |
| 5,446,891 A | 8/1995 | Kaplan et al. ............... 395/600 |
| 5,522,089 A | 5/1996 | Kikinis et al. ................. 710/73 |
| 5,535,323 A * | 7/1996 | Miller et al. ................. 715/707 |
| 5,541,836 A | 7/1996 | Church et al. .................. 704/7 |
| 5,546,521 A * | 8/1996 | Martinez ..................... 715/711 |
| 5,581,684 A * | 12/1996 | Dudzik et al. ............... 715/708 |
| 5,596,700 A | 1/1997 | Darnell et al. ............... 715/512 |
| 5,617,565 A | 4/1997 | Augenbraun et al. ........ 395/604 |
| 5,625,783 A | 4/1997 | Ezekiel et al. ............... 395/352 |
| 5,627,567 A | 5/1997 | Davidson .................... 345/173 |
| 5,627,958 A | 5/1997 | Potts et al. ................... 715/708 |
| 5,634,019 A | 5/1997 | Koppolu et al. ............. 715/744 |
| 5,640,560 A | 6/1997 | Smith ......................... 395/615 |
| 5,657,259 A | 8/1997 | Davis et al. ................. 708/204 |
| 5,685,000 A | 11/1997 | Cox .............................. 704/9 |
| 5,708,825 A | 1/1998 | Sotomayor .................. 395/762 |
| 5,715,415 A * | 2/1998 | Dazey et al. ................ 715/708 |
| 5,717,923 A | 2/1998 | Dedrick ....................... 395/613 |
| 5,752,022 A | 5/1998 | Chiu et al. ................... 395/610 |
| 5,761,689 A | 6/1998 | Rayson et al. ............... 707/533 |
| 5,764,794 A | 6/1998 | Perlin ......................... 382/186 |
| 5,765,156 A | 6/1998 | Guzak et al. ................. 707/100 |
| 5,781,189 A | 7/1998 | Holleran et al. ............. 715/826 |
| 5,781,904 A | 7/1998 | Oren et al. ................... 707/100 |
| 5,794,257 A | 8/1998 | Liu et al. ..................... 707/501 |
| 5,799,068 A | 8/1998 | Kikinis et al. ............ 379/93.06 |
| 5,802,253 A | 9/1998 | Gross et al. .................. 395/51 |
| 5,802,262 A | 9/1998 | Van De Vanter ............ 395/180 |
| 5,802,299 A | 9/1998 | Logan et al. ........... 395/200.48 |
| 5,802,530 A | 9/1998 | van Hoff ..................... 707/513 |
| 5,805,911 A | 9/1998 | Miller ......................... 395/796 |
| 5,809,318 A | 9/1998 | Rivette et al. ................ 715/512 |
| 5,815,830 A | 9/1998 | Anthony ....................... 707/6 |
| 5,818,447 A | 10/1998 | Wolf et al. ................... 715/752 |
| 5,821,931 A | 10/1998 | Berquist et al. ............. 715/784 |
| 5,822,539 A | 10/1998 | van Hoff ................ 395/200.66 |
| 5,822,720 A | 10/1998 | Bookman et al. .............. 704/3 |
| 5,826,025 A | 10/1998 | Gramlich ............... 395/200.47 |
| 5,832,100 A | 11/1998 | Lawton et al. ............... 382/100 |
| 5,845,077 A | 12/1998 | Fawcett ....................... 709/221 |
| 5,855,007 A | 12/1998 | Jovicic et al. ................. 705/14 |
| 5,859,636 A | 1/1999 | Pandit ....................... 715/501.1 |
| 5,872,973 A | 2/1999 | Mitchell et al. ............. 395/685 |
| 5,875,443 A | 2/1999 | Nielsen ........................ 707/2 |
| 5,877,757 A * | 3/1999 | Baldwin et al. ............. 715/705 |
| 5,884,266 A | 3/1999 | Dvorak .................... 704/270.1 |
| 5,892,919 A | 4/1999 | Nielsen .................. 395/200.58 |
| 5,893,073 A | 4/1999 | Kasso et al. .................... 705/8 |
| 5,893,132 A | 4/1999 | Huffman et al. ............. 715/201 |
| 5,895,461 A | 4/1999 | De La Huerga et al. ......... 707/1 |
| 5,896,321 A | 4/1999 | Miller et al. ............ 365/189.01 |
| 5,900,004 A | 5/1999 | Gipson ....................... 707/530 |
| 5,907,852 A | 5/1999 | Yamada ...................... 715/541 |
| 5,913,214 A | 6/1999 | Madnick et al. .............. 707/10 |
| 5,920,859 A | 7/1999 | Li ................................ 707/5 |
| 5,924,099 A | 7/1999 | Guzak et al. ................. 707/100 |
| 5,933,139 A * | 8/1999 | Feigner et al. ............... 715/708 |
| 5,933,140 A * | 8/1999 | Strahorn et al. ............. 715/712 |
| 5,933,498 A | 8/1999 | Schneck et al. ............... 705/54 |
| 5,940,614 A * | 8/1999 | Allen et al. .................. 717/120 |
| 5,944,787 A | 8/1999 | Zoken .......................... 709/206 |
| 5,946,647 A | 8/1999 | Miller et al. ................... 704/9 |
| 5,948,061 A | 9/1999 | Merriman et al. ............ 709/219 |
| 5,956,681 A | 9/1999 | Yamakita ..................... 704/260 |
| 5,974,413 A | 10/1999 | Beauregard et al. ............ 707/6 |
| 5,987,480 A * | 11/1999 | Donohue et al. .......... 715/501.1 |
| 5,991,719 A | 11/1999 | Yazaki et al. ................ 704/251 |
| 5,995,756 A | 11/1999 | Herrmann .................... 395/712 |
| 6,006,265 A | 12/1999 | Rangan et al. ............... 709/226 |
| 6,006,279 A | 12/1999 | Hayes ......................... 719/328 |
| 6,014,616 A | 1/2000 | Kim .............................. 704/8 |
| 6,018,761 A | 1/2000 | Uomini ....................... 706/206 |
| 6,028,605 A | 2/2000 | Conrad et al. ............... 345/840 |
| 6,029,135 A | 2/2000 | Krasle ........................ 704/275 |
| 6,029,171 A | 2/2000 | Smiga et al. ................. 707/102 |
| 6,031,525 A | 2/2000 | Perlin ......................... 345/173 |
| 6,052,531 A | 4/2000 | Waldin et al. ............... 717/170 |
| 6,061,516 A | 5/2000 | Yoshikawa et al. .......... 717/109 |
| 6,067,087 A | 5/2000 | Krauss et al. ................ 715/762 |
| 6,072,475 A | 6/2000 | Van Ketwich ............... 345/173 |
| 6,073,090 A | 6/2000 | Fortune et al. .................. 704/8 |
| 6,085,201 A | 7/2000 | Tso ............................ 715/505 |
| 6,088,711 A | 7/2000 | Fein et al. .................... 715/523 |
| 6,092,074 A | 7/2000 | Rodkin et al. ............... 707/102 |
| 6,108,640 A | 8/2000 | Slotznick ...................... 705/26 |
| 6,108,674 A | 8/2000 | Murakami et al. ........... 715/515 |
| 6,112,209 A | 8/2000 | Gusack ....................... 707/101 |
| 6,121,968 A | 9/2000 | Arcuri et al. ................. 345/352 |
| 6,122,647 A | 9/2000 | Horowitz et al. ............. 707/513 |
| 6,126,306 A | 10/2000 | Ando ......................... 708/605 |
| 6,137,911 A | 10/2000 | Zhilyaev ..................... 382/225 |
| 6,141,005 A | 10/2000 | Hetherington et al. ....... 715/866 |
| 6,151,643 A | 11/2000 | Cheng et al. .................. 710/36 |
| 6,154,738 A | 11/2000 | Call ............................. 707/4 |
| 6,167,469 A | 12/2000 | Safai et al. .................... 710/62 |
| 6,167,523 A | 12/2000 | Strong .......................... 726/21 |
| 6,167,568 A | 12/2000 | Gandel et al. ............... 717/176 |
| 6,173,316 B1 | 1/2001 | DeBoor et al. ............... 709/218 |
| 6,182,029 B1 | 1/2001 | Friedman ...................... 704/9 |
| 6,185,550 B1 | 2/2001 | Snow et al. .................... 707/1 |
| 6,185,576 B1 | 2/2001 | McIntosh .................... 707/200 |
| 6,199,046 B1 | 3/2001 | Heinzle et al. ................. 705/1 |
| 6,199,081 B1 | 3/2001 | Meyerzon et al. ........... 715/513 |
| 6,208,338 B1 * | 3/2001 | Fischer et al. ............... 715/705 |
| 6,219,698 B1 | 4/2001 | Iannucci et al. ............. 709/221 |
| 6,246,404 B1 * | 6/2001 | Feigner et al. ............... 715/708 |
| 6,262,728 B1 | 7/2001 | Alexander ................. 345/440.1 |
| 6,272,074 B1 | 8/2001 | Winner ......................... 368/10 |
| 6,272,505 B1 | 8/2001 | De La Huerga ............. 707/501 |
| 6,282,489 B1 | 8/2001 | Bellesfield et al. ........... 701/201 |
| 6,291,785 B1 | 9/2001 | Koga et al. .................. 209/584 |
| 6,292,768 B1 | 9/2001 | Chan ............................ 704/1 |
| 6,295,061 B1 | 9/2001 | Park et al. .................... 715/764 |
| 6,297,822 B1 * | 10/2001 | Feldman ...................... 715/705 |
| 6,300,950 B1 * | 10/2001 | Clark et al. .................. 715/705 |
| 6,308,171 B1 | 10/2001 | De La Huerga ............... 707/3 |
| 6,311,152 B1 | 10/2001 | Bai et al. ....................... 704/9 |
| 6,311,177 B1 | 10/2001 | Dauerer et al. ................. 707/2 |
| 6,311,194 B1 | 10/2001 | Sheth et al. ................. 715/505 |
| 6,320,496 B1 | 11/2001 | Sokoler et al. ............ 340/470.1 |
| 6,323,853 B1 | 11/2001 | Hedloy ........................ 345/339 |
| 6,336,125 B2 | 1/2002 | Noda et al. .................. 715/531 |
| 6,336,131 B1 | 1/2002 | Wolfe ......................... 709/203 |
| 6,338,059 B1 | 1/2002 | Fields et al. ................... 707/4 |
| 6,339,436 B1 * | 1/2002 | Amro et al. ................. 715/714 |
| 6,339,755 B1 | 1/2002 | Hetherington et al. ......... 704/8 |
| 6,347,398 B1 | 2/2002 | Parthasarathy et al. ........ 717/11 |
| 6,349,295 B1 | 2/2002 | Tedesco et al. ................. 707/3 |
| 6,353,926 B1 | 3/2002 | Pathesarathy et al. ....... 717/170 |
| 6,381,742 B2 * | 4/2002 | Forbes et al. ................ 717/176 |
| 6,382,350 B1 | 5/2002 | Jezewski et al. ............. 181/290 |
| 6,392,668 B1 | 5/2002 | Murray ........................ 715/38 |
| 6,396,515 B2 | 5/2002 | Hetherington et al. ....... 715/762 |
| 6,401,067 B2 | 6/2002 | Lewis et al. ................. 704/275 |
| 6,408,323 B1 | 6/2002 | Kobayashi et al. ........... 709/100 |

| Patent | Type | Date | Inventor | Class |
|---|---|---|---|---|
| 6,413,100 | B1 * | 7/2002 | Dickmeyer et al. | 434/322 |
| 6,415,304 | B1 | 7/2002 | Horvitz | 715/205 |
| 6,421,678 | B2 | 7/2002 | Smiga et al. | 707/102 |
| 6,424,979 | B1 | 7/2002 | Livingston et al. | 715/511 |
| 6,434,567 | B1 | 8/2002 | De La Huerga | 707/102 |
| 6,438,545 | B1 | 8/2002 | Beauregard et al. | 707/6 |
| 6,441,753 | B1 | 8/2002 | Montgomery | 341/34 |
| 6,442,545 | B1 | 8/2002 | Feldman et al. | 707/8 |
| 6,442,591 | B1 | 8/2002 | Haynes et al. | 709/206 |
| 6,456,304 | B1 | 9/2002 | Anguilo et al. | 715/779 |
| 6,470,091 | B2 | 10/2002 | Koga et al. | 382/101 |
| 6,473,069 | B1 | 10/2002 | Gerpheide | 345/157 |
| 6,477,510 | B1 | 11/2002 | Johnson | 705/30 |
| 6,480,860 | B1 | 11/2002 | Monday | 707/102 |
| 6,493,006 | B1 | 12/2002 | Gourdol et al. | 345/825 |
| 6,498,982 | B1 | 12/2002 | Bellesfield et al. | 701/202 |
| 6,510,504 | B2 | 1/2003 | Satyanarayanan | 711/170 |
| 6,516,321 | B1 | 2/2003 | De La Huerga | 707/102 |
| 6,519,557 | B1 | 2/2003 | Emens et al. | 704/8 |
| 6,519,603 | B1 | 2/2003 | Bays et al. | 707/102 |
| 6,546,433 | B1 | 4/2003 | Matheson | 709/318 |
| 6,553,385 | B2 | 4/2003 | Johnson et al. | 707/104.1 |
| 6,556,972 | B1 | 4/2003 | Bakis et al. | 704/4 |
| 6,556,984 | B1 | 4/2003 | Zien | 707/2 |
| 6,564,264 | B1 | 5/2003 | Creswell et al. | 709/245 |
| 6,571,241 | B1 | 5/2003 | Nosohara | 707/6 |
| 6,571,253 | B1 | 5/2003 | Thompson et al. | 707/103 R |
| 6,591,260 | B1 | 7/2003 | Schwarzhoff et al. | 707/2 |
| 6,595,342 | B1 | 7/2003 | Maritzen et al. | 194/212 |
| 6,601,075 | B1 * | 7/2003 | Huang et al. | 707/104.1 |
| 6,604,099 | B1 | 8/2003 | Chung et al. | 707/3 |
| 6,615,131 | B1 | 9/2003 | Rennard et al. | 701/200 |
| 6,618,733 | B1 | 9/2003 | White et al. | 707/103 |
| 6,622,140 | B1 | 9/2003 | Kantrowitz | 707/5 |
| 6,623,527 | B1 | 9/2003 | Hamzy | 715/513 |
| 6,625,581 | B1 | 9/2003 | Perkowski | 705/27 |
| 6,629,079 | B1 | 9/2003 | Spiegel et al. | 705/26 |
| 6,631,519 | B1 | 10/2003 | Nicholson et al. | 717/169 |
| 6,636,880 | B1 | 10/2003 | Bera | 708/206 |
| 6,643,650 | B1 | 11/2003 | Slaughter et al. | 707/10 |
| 6,654,734 | B1 | 11/2003 | Mani et al. | 707/2 |
| 6,654,932 | B1 | 11/2003 | Bahrs et al. | 715/507 |
| 6,658,623 | B1 | 12/2003 | Schilit et al. | 715/513 |
| 6,687,485 | B2 | 2/2004 | Hopkins et al. | 434/350 |
| 6,694,307 | B2 | 2/2004 | Julien | 707/3 |
| 6,697,824 | B1 | 2/2004 | Bowman-Amuah | 709/229 |
| 6,697,837 | B1 * | 2/2004 | Rodov | 709/203 |
| 6,708,189 | B1 | 3/2004 | Fitzsimons et al. | 707/205 |
| 6,715,144 | B2 | 3/2004 | Daynes et al. | 717/174 |
| 6,717,593 | B1 | 4/2004 | Jennings | 715/760 |
| 6,718,516 | B1 | 4/2004 | Claussen et al. | 715/513 |
| 6,728,679 | B1 | 4/2004 | Strubbe et al. | 704/270.1 |
| 6,732,090 | B2 | 5/2004 | Shanahan et al. | 707/3 |
| 6,732,361 | B1 | 5/2004 | Andreoli et al. | 719/313 |
| 6,741,994 | B1 | 5/2004 | Kang et al. | 707/102 |
| 6,742,054 | B1 | 5/2004 | Upton, IV | 710/6 |
| 6,745,208 | B2 | 6/2004 | Berg et al. | 707/201 |
| 6,766,326 | B1 | 7/2004 | Cena | 707/101 |
| 6,795,808 | B1 | 9/2004 | Strubbe et al. | 704/275 |
| 6,802,061 | B1 * | 10/2004 | Parthasarathy et al. | 717/173 |
| 6,826,726 | B2 | 11/2004 | Hsing et al. | 715/513 |
| 6,829,631 | B1 | 12/2004 | Forman et al. | 709/202 |
| 6,845,499 | B2 | 1/2005 | Srivastava et al. | 717/100 |
| 6,857,103 | B1 * | 2/2005 | Wason | 715/709 |
| 6,859,908 | B1 | 2/2005 | Clapper | 715/224 |
| 6,868,525 | B1 | 3/2005 | Szabo | 715/738 |
| 6,874,125 | B1 | 3/2005 | Carroll et al. | 715/705 |
| 6,874,143 | B1 * | 3/2005 | Murray et al. | 717/173 |
| 6,880,129 | B1 * | 4/2005 | Lee et al. | 715/763 |
| 6,883,137 | B1 | 4/2005 | Girardot et al. | 715/513 |
| 6,898,604 | B1 | 5/2005 | Ballinger et al. | 707/101 |
| 6,901,402 | B1 | 5/2005 | Corston-Oliver et al. | 701/101 |
| 6,904,560 | B1 | 6/2005 | Panda | 715/202 |
| 6,925,457 | B2 | 8/2005 | Britton et al. | 707/1 |
| 6,925,470 | B1 | 8/2005 | Sangudi et al. | 707/102 |
| 6,944,857 | B1 * | 9/2005 | Glaser et al. | 717/173 |
| 6,948,133 | B2 | 9/2005 | Haley | 715/780 |
| 6,950,831 | B2 | 9/2005 | Haley | 707/104.1 |
| 6,950,982 | B1 | 9/2005 | Dourish | 715/512 |
| 6,957,385 | B2 | 10/2005 | Chan et al. | 715/504 |
| 6,963,867 | B2 | 11/2005 | Ford et al. | 707/3 |
| 6,964,010 | B1 | 11/2005 | Sharp | 715/507 |
| 6,975,983 | B1 | 12/2005 | Fortescue et al. | 704/9 |
| 6,976,090 | B2 * | 12/2005 | Ben-Shaul et al. | 709/246 |
| 6,976,209 | B1 | 12/2005 | Storisteanu et al. | 715/512 |
| 6,981,212 | B1 | 12/2005 | Claussen et al. | 715/205 |
| 6,986,104 | B2 | 1/2006 | Green et al. | 715/523 |
| 6,990,654 | B2 * | 1/2006 | Carroll, Jr. | 717/109 |
| 7,003,522 | B1 | 2/2006 | Reynar et al. | 707/10 |
| 7,013,289 | B2 | 3/2006 | Horn et al. | 705/26 |
| 7,024,658 | B1 * | 4/2006 | Cohen et al. | 717/117 |
| 7,028,312 | B1 | 4/2006 | Merrick et al. | 719/330 |
| 7,032,174 | B2 | 4/2006 | Montero et al. | 715/257 |
| 7,039,859 | B1 | 5/2006 | Sundaresan | 715/229 |
| 7,051,076 | B2 | 5/2006 | Tsuchiya | 709/206 |
| 7,082,392 | B1 | 7/2006 | Butler et al. | 704/233 |
| 7,100,115 | B1 * | 8/2006 | Yennaco | 715/748 |
| 7,113,976 | B2 | 9/2006 | Watanabe | 709/206 |
| 7,146,564 | B2 | 12/2006 | Kim et al. | 715/235 |
| 7,216,351 | B1 | 5/2007 | Maes | 719/328 |
| 7,237,190 | B2 | 6/2007 | Rollins et al. | 715/234 |
| 7,281,245 | B2 | 10/2007 | Reynar et al. | 717/173 |
| 7,302,634 | B2 | 11/2007 | Lucovsky et al. | 715/200 |
| 7,305,354 | B2 | 12/2007 | Rodriguez et al. | 705/26 |
| 7,392,479 | B2 | 6/2008 | Jones et al. | 715/513 |
| 7,421,645 | B2 | 9/2008 | Reynar | 715/206 |
| 7,454,459 | B1 | 11/2008 | Kapoor et al. | 709/203 |
| 7,707,024 | B2 | 4/2010 | Arayasantiparb et al. | |
| 7,707,496 | B1 | 4/2010 | Moore et al. | |
| 7,712,024 | B2 | 5/2010 | Reynar et al. | |
| 7,716,163 | B2 | 5/2010 | Reynar et al. | |
| 7,716,676 | B2 | 5/2010 | Sawicki et al. | |
| 7,739,588 | B2 | 6/2010 | Reynar et al. | |
| 7,742,048 | B1 | 6/2010 | Moore et al. | |
| 7,770,102 | B1 | 8/2010 | Wolff et al. | |
| 7,778,816 | B2 | 8/2010 | Reynar | |
| 7,783,614 | B2 | 8/2010 | Jones et al. | |
| 7,788,602 | B2 | 8/2010 | Reynar et al. | |
| 2001/0029605 | A1 | 10/2001 | Forbes et al. | 717/11 |
| 2001/0041328 | A1 | 11/2001 | Fisher | 434/157 |
| 2001/0042098 | A1 | 11/2001 | Gupta et al. | 709/206 |
| 2001/0049702 | A1 | 12/2001 | Najmi | 707/513 |
| 2001/0056461 | A1 | 12/2001 | Kampe et al. | 709/201 |
| 2002/0002590 | A1 | 1/2002 | King et al. | 709/206 |
| 2002/0003469 | A1 | 1/2002 | Gupta | 340/407.1 |
| 2002/0003898 | A1 | 1/2002 | Wu | 382/187 |
| 2002/0004803 | A1 | 1/2002 | Serebrennikov | 715/513 |
| 2002/0007309 | A1 | 1/2002 | Reynar | 705/14 |
| 2002/0023113 | A1 | 2/2002 | Hsing et al. | 707/513 |
| 2002/0023136 | A1 | 2/2002 | Silver et al. | 709/206 |
| 2002/0026450 | A1 | 2/2002 | Kuramochi | 707/104.1 |
| 2002/0029304 | A1 | 3/2002 | Reynar et al. | 709/332 |
| 2002/0035581 | A1 | 3/2002 | Reynar et al. | 715/513 |
| 2002/0038180 | A1 | 3/2002 | Bellesfield et al. | 701/202 |
| 2002/0065110 | A1 | 5/2002 | Enns et al. | 455/566 |
| 2002/0065891 | A1 | 5/2002 | Malik | 709/206 |
| 2002/0066073 | A1 | 5/2002 | Lienhard et al. | 717/105 |
| 2002/0078222 | A1 | 6/2002 | Compas et al. | 709/232 |
| 2002/0091803 | A1 | 7/2002 | Imamura et al. | 709/220 |
| 2002/0099687 | A1 | 7/2002 | Krishnaprasad et al. | 707/1 |
| 2002/0100036 | A1 | 7/2002 | Moshir et al. | 717/173 |
| 2002/0103829 | A1 | 8/2002 | Manning et al. | 707/513 |
| 2002/0104080 | A1 | 8/2002 | Woodard et al. | 717/176 |
| 2002/0110225 | A1 | 8/2002 | Cullis | 379/67.1 |
| 2002/0111928 | A1 | 8/2002 | Haddad | 707/1 |
| 2002/0120685 | A1 * | 8/2002 | Srivastava et al. | 709/203 |

| Publication No. | Date | Inventor | Class |
|---|---|---|---|
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gombocz et al. | 707/100 |
| 2002/0169802 A1 | 11/2002 | Brewer et al. | 707/513 |
| 2002/0175955 A1 | 11/2002 | Gourdol et al. | 345/821 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1* | 1/2003 | Mah et al. | 717/170 |
| 2003/0025728 A1 | 2/2003 | Ebbo et al. | 345/744 |
| 2003/0046316 A1 | 3/2003 | Gergic et al. | 707/513 |
| 2003/0050911 A1 | 3/2003 | Lucovsky et al. | 707/1 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 171/173 |
| 2003/0195937 A1 | 10/2003 | Kircher et al. | 709/207 |
| 2003/0212527 A1 | 11/2003 | Moore et al. | 702/104 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1* | 10/2004 | Lucovsky | 715/500 |
| 2004/0201867 A1* | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0 481 784 A | 4/1992 |
| EP | 0598511 A | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A | 3/1995 |
| WO | WO 99 17240 A | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/37170 A3 | 5/2001 |
| WO | WO 01/86390 A2 | 11/2001 |
| WO | WO 01/186390 A2 | 11/2001 |
| WO | WO 02/99627 A1 | 1/2002 |
| WO | WO 02/099627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Braganholo VDP; "Updating Relationship Databases Through XML Views", *Technical Report RP-328*, Online (http://www.inf.ufrgs.br/{vanessa/disc/iplinas/PropostaTese.pdf), Porto Alegre, RS, Brasil, Sep. 2002, XP-002279067, pp. 1-61.

Falquet G et al., "Design and Analysis of Active Hypertext Views on Databases", *CUI-Technical Report*, Online (http://cui.unige.ch/isi/reports/design-anls-ahtv.pdf), Jan. 2002, XP-002279068, pp. 1-24.

Ceri S et al., "Deriving Production Rules for Incremental View Maintenance", *Proceedings of the International Conference on Very Large Data Bases*, 1994, XP-00914159, pp. 577-589.

Bonifati A., "Active Behaviors Within XML Document Management", *EDBT Ph.D. Workshop*, (EDBT Ph.D. WS 2000), Online (http://www.ebdt2000.uni-konstanz.de/phd-workshop/papers/Bonifati.ps), Mar. 2000, Konstanz, Germany, XP-002279069, pp. 1-4.

Official Action issued by USPTO dated Apr. 8, 2005 in connection with U.S. Appl. No. 10/164,960, filed Jun. 6, 2002 (32 pages).

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Integrated Development Environment (IDE)", http://web.archive.org/web/20020602032242/http://altova.com/products_ide.html, Jun. 2002, pp. 1-2.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http://web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

"The Corel-XyEnterprise XML Solution", http://web.archive.org/web/20030807154335/www.corel.com/futuretense_cs/ccurl/corel+and+XY+enterprise+XML+solution.pdf, Aug. 2003, pp. 1-2.

U.S. Office Action, dated Sep. 2, 2005, U.S. Appl. No. 10/366,141, filed Feb. 13, 2003, entitled, "Linking Elements of a Document to Corresponding Fields, Queries and/or Procedures in a Database," Inventors: Brian Jones, Marcin Sawicki.

Flanagan, David; "JavaScript—The Definitive Guide, Fourth Edition", Jan. 2002.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resoures;* ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *CLUES: dynamic personalized message filtering*; Proceedings of the ACM 1996 conference on computer supported cooperative work (1996) p. 113-121.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

Pentland, Alex; *Perceptual user interfaces: perpetual intelligence*; Commun. ACM 43, 3 (Mar. 2000) p. 35-44.

Stairmand, Mark A.; *Textual context analysis for information retrieval*; Proceedings of the 20th annual international ACM SIGIR conference on research and development in information retrieval (1997) p. 140-147.

Glushko, Robert J., Jay M. Tenenbaum and Bart Meltzer; *An XML framework for agent-based E-commerce*; Commun. ACM 42, 3 (Mar. 1999) p. 106.

Kukich, Karen; *Techniques for Automatically Correcting Words in Text*; ACM Comput. Surv., 24, 4 (Dec. 1992); pp. 377-439.

Marx, Matt and Chris Schmandt; *Putting People First: Specifying Proper Names in Speech Interfaces*; Proceedings of the ACM Symposium on User Interface Software and Technology; 1994; pp. 29-37.

Ford, Bryan, Mike Hibler, Jay Lepreau, Roland McGrath and Patrick Tullman; *Interface and execution models in the fluke kernel;* Proceedings of the third symposium on operating systems design and implementation, (1999) p. 101-115.

Desmarais, Michel C. and Jiming Liu; *Exploring the applications of user-expertise assessment for intelligent interfaces;* Proceedings of the conference on human factors in computing systems, (1993) p. 308-313.

Foley, James D.; *Future directions in user-computer interface software*; Conference proceedings on organizational computer systems, (1991) p. 289-297.

Hartson, H. Rex and Deborah Hix; *Human-computer interface development: concepts and systems for its management*; ACM Comput. Surv. 1 (Mar. 1989) p. 5-92.

Foley, Jim; *Integrating computer technology, people technology; and application technology strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input*; Proceedings of the seventh workshop on hottopics in operating systems, (1999) p. 179-84.

*Microsoft Computer Dictionary*, Microsoft, Microsoft Press, Fifth Edition, p. 409.

Kuenning, Geoff, "Using ISPELL from Emacs", http://theochem.ki.ku.dk/on_line_docs/ispell/ispell_1.html, 4 pp., publication date unknown.

"Spellout Command", Commands Reference, vol. 5, http://www.rz.uni-hohenheim.de/betriebssysteme/unix/aix/aix_4.3.3_doc/base_doc/usr/share/man/inf..., 1 page, publication date unknown.

"Chapter 8—Standard Input and Output", http://www.comp.lanes.ac.uk/computing/users/eiamjw/unix/chap8.html, 3 pp., publication date unknown.

Panagiotis, Christias, Man-cgi 1.15, http://www.physics.umn.edu/cgi-bin/man-cgi?spell, 1994, 5 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.

"Module 123—Spell", http://duplex.hypermart.net/books/bsd/501-504.html, 4 pp., publication date unknown.

Panagiotis, Christias, Man-cgi 1.15, http://www.calpoly.edu/cgi-bin/man-cgi?spell+1, 1994, 3 pp.

Willisson, Pace, Ispell (1), http://www.rt.com/man/findaffix.1.html, 1983, 15 pp.

Willisson, Pace, Ispell (1), "User Commands", http://www.csee.usf.edu/cgi-bin/man-cgi?ispell, 1983, 18 pp.

"Handout 38: Spell Checking, Word Counting, and Textual Analysis", http://courses.cs.emporia.edu/pheattch/courses/2002/cs501s02/hand38/, 3 pp., publication date unknown.

Keunning, Geoff, "International Ispell", http://fmg-www.cs.ucla.edu/geoff.ispell.html, 3 pp., publication date unknown.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, pp. 16.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

IBM Corporation, "IBM Research Disclosure #368; Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

Hewkin, "Smart Tags-the Distributed-Memory Revolution", IEE Review, Jun. 22, 1989, pp. 203-206.

Measuring Units Conversion Table—http://web.archie.org- 1997 Internet French Property, pp. 1-4.

IBM Technical Disclosure Bulletin, "National Language Support Enablement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Part-Linking", Proceedings of the Sixth International Conference on Information and Knowledge Management, published by ACM Press 1997, pp. 317-324.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"What is Flyswat", http://www.flyswat.com, download date: Sep. 28, 1999, 5 pp.

"Intelligent Text Processing: About", http://www.syntalex.co.uk/about/.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Sriram, V., "ComponentXchange: An E-Exchange for Software Components", Master Thesis, CitSeer, May 2001, pp. i-v, 1-77.

"Smart Tags: Dumb Technology?", webreference.com, Online, Aug. 29, 2001, http://webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 09/818,157, filed Mar. 27, 2001, entitled "Automatically Adding Proper Names to a Database".

U.S. Appl. No. 09/841,265, filed Apr. 24, 2001, entitled "Method and System for Applying Input Mode Bias".

U.S. Appl. No. 09/841,266, filed Apr. 24, 2001, entitled "Method and System for Providing Electronic Commerce Actions Based in Semantically Labeled Strings".

U.S. Appl. No. 09/906,552, filed Jul. 16, 2001, entitled "Method and System for Providing Restricted Actions for Recognized Semantic Categories".

U.S. Appl. No. 09/906,467, filed Jul. 16, 2001, entitled "Application Program Interfaces for Semantically Labeling Strings and Providing Actions Based on Semantically Labeled Strings".

U.S. Appl. No. 09/907,418, filed Jul. 17, 2001, entitled "Method and System for Defining Semantic Categories and Actions".

U.S. Appl. No. 09/588,411, filed Jun. 6, 2000, entitled "Method and System for Semantically Labelling Strings and Providing Actions Based on Semantically Labeled Strings".

U.S. Appl. No. 10/141,712, filed May 9, 2002, entitled "Method, System, and Apparatus for Converting Dates Between Calendars and Languages Based Upon Semantically Labeling Strings".

U.S. Appl. No. 10/154,630, filed May 23, 2002, entitled "Method, System, and Apparatus for Converting Numbers Based Upon Semantically Labeled Strings".

U.S. Appl. No. 10/140,544, filed May 7, 2002, entitled "Method, System, and Apparatus for Converting Numbers Between Measurement Systems Based Upon Semantically Labeled Strings".

U.S. Appl. No. 10/155,680, filed May 23, 2002, entitled "Method, System, and Apparatus for Converting Currency Values Based Upon Semantically Labeled Strings".
U.S. Appl. No. 10/179,810, filed Jun. 25, 2002, entitled "Method, System, and Apparatus for Performing Custom Actions on Digital Content".
U.S. Appl. No. 10/178,680, filed Jun. 24, 2002, entitled "System and Method for Incorporating Smart Tags in Online Content".
U.S. Appl. No. 10/179,438, filed Jun. 25, 2002, entitled "Method and System for Dynamically Providing Actions Associated with Semantically Labeled Strings".
U.S. Appl. No. 10/184,298, filed Jun. 27, 2002, entitled "Method and System for Associating Actions with Semantic Labels in Electronic Documents".
U.S. Appl. No. 10/377,258, filed Feb. 28, 2003, entitled "Method and System for Enhancing Paste Functionality of a Computer Software Application".
U.S. Appl. No. 10/426,446, filed Apr. 29, 2003, entitled "Methods and System for Recognizing Names in a Computer-Generated Document and for Providing Helpful Actions Associated with Recognized Names".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. 10/184,298.
U.S. Official Action dated Feb. 24, 2006 in U.S. Appl. No. 10/154,630.
U.S. Appl. No. 11/396,937, filed Apr. 3, 2006, entitled "Automatically Adding Proper Names to a Database".
U.S. Official Action dated Nov. 10. 2005 in U.S. Appl. No. 10/164,260.
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Official Action dated Apr. 17, 2006 in U.S. Appl. No. 10/184,190.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
European Communication dated Nov. 17, 2006 in EP 03 011 851.7-2211.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
U.S. Official Action dated Dec. 20, 2006 in U.S. Appl. No. 10/154,630.
U.S. Final Official Action dated Dec. 26, 2006 in U.S. Appl. No. 10/179,810.
U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

Homer, Alex; Enfield, Andrew; Gross, Christian; Jakab, Stephen; Hartwell, Bruce; Gill, Darren; Francis, Brian; Harrison, Richard, "Professional Active Server Pages", WROX Press Ltd., 1997, Chapter 6, Part 2, Section "Client-Side Scripting and Components", Subsection "Choosing Your Applets and Controls", pp. 1-32.

Brockschmidt, Kraig; "Inside OLE, Second Edition", 1995 Microsoft Press, p. 169.

Toth, Viktor, "Visual C++ 4 Unleashed", 1996, Sams Publishing, p. 174.

Bosak: "XML: The Universal Publishing Format," SGML/XML Europe 1998, (XP00228575) May 1998, pp. A1-C17.

Kristensen, "Template Resolution In XML/HTML," Computer Networks and ISDN Systems, vol. 30, 1998, (XP004121423) pp. 239-249.

Fan, et al., "FormPlus: A Form Authoring Toolkit," Proceedings of the Fourteenth Annual Computer Software and Applications Conference, Oct. 31-Nov. 2, 1990, pp. 255-260 (XP000223616).

Boone, "Concept Features In Re: Agent, An Intelligent Email Agent," Proceedings of the 2nd International Conference on Autonomous Agents, May 9-13, 1998, (XP000887407), pp. 141-148.

Takkinen, et al., "CAFE: A Conceptual Model for Managing Information In Electronic Mail," Proceedings of the Annual Hawaii International Conference on System Sciences, 1998 (XP000775829), pp. 44-53.

Santos, C.A.S., L,F.G Soares, G.L. de Souza and J.P. Courtiat; *Design methodology and formal validation of hypermedia documents*; Proceedings of the sixth ACM international conference on multimedia, (1998) p. 39-48.

Marx, Matthew and Chris Schmandt; *CLUES; dynamic personalized message filtering*; Proceedings of the ACM 1996 conference on computer supported cooperative work (1996) p. 113-121.

Pentland, Alex; *Perceptual user interfaces: perceptual intelligence*; Commun. ACM 43, 3 (Mar. 2000) p. 35-44.

Desmarais, Michel C. and Jiming Liu; *Exploring the applications user-expertise assessment for intelligent interfaces*; Proceedings of the conference on human factors in computing systems, (1993) p. 308-313.

Foley, James D.; *Future directions in user-computer interface software*; Conference proceedings on organizational computer systems, (1991) p. 289-297.

Foley, Jim; *Integrating computer technology, people technology: strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input*; Proceedings of the seventh workshop on operating systems, (1999) p. 179-84.

"Spelling Command", Commands Reference, vol. 5, http://www.rz.uni-hohenhoim.de/betriebssysteme/unix/aix/aix_4.3.3_doc/base_doc/usr/ share/man/inf..., 1 page, publication date unknown.

"Chapter 8—Standard Input and Output", http://www.comp.lancs.ac.uk/computing/users/eiamjw/unix/chap8.html, 3 pp., publication date unknown.

Panagiotis, Christias, Man-cgi 1.15, http://www.physics.umn.edu/cgi-bin/man-cgi?spell, 1994, 5 pp.

Martensson, Bengt, "Thread-Enhanced Spell Front End for GNU Emacs+Detex+Delatex", http://www.geocrawler.com/archives/3/337/1987/8/0/1871981/, Aug. 20, 1987, 1 page.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, pp. 16.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

IBM Corporation, "IBM Research Disclosure #368; Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

Hewkin, "Smart Tags-the Distributed-Memory Revolution", IEE Review, Jun. 22, 1989, pp. 203-206.

Measuring Units Conversion Table—http://web.archie.org- 1997 Internet French Property, pp. 1-4.

IBM Technical Disclosure Bulletin, "National Language Support Enablement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmartag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Part-Linking", Proceedings of the Sixth International Conference on Information and Knowledge Management, published by ACM Press 1997, pp. 317-324.

Schultz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/scrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Sriram, V., "ComponentXchange: An E-Exchange for Software Components", Master Thesis, CitSeer, May 2001, pp. i-v, 1-77.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.com.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov.cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Final Office Action dated Oct. 19, 2006 cited in U.S. Appl. No. 09/906,467.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

U.S. Official Action dated Sep. 28, 2006 cited in U.S. Appl. No. 10/608,267.

U.S. Final Official Action dated Oct. 5, 2006 cited in U.S. Appl. No. 09/841,266.

U.S. Official Action dated Oct. 6, 2006 cited in U.S. Appl. No. 10/140,544.

U.S. Official Action dated Oct. 10, 2006 cited in U.S. Appl. No. 09/841,265.

European Communication dated Apr. 19, 2006 in EP 05 000 506.5-1527.

U.S. Official Action dated Sep. 7, 2006 cited in U.S. Appl. No. 10/155,680.

U.S. Official Action dated Aug. 9, 2006 cited in U.S. Appl. No. 10/164,960.

U.S. Final Official Action dated Aug. 18, 2006 cited in U.S. Appl. No. 09/907,418.

U.S. Final Official Action dated Jul. 19, 2006 in U.S. Appl. No. 09/906,552.

U.S. Official Action dated May 14, 2007 cited in U.S. Appl. No. 09/906,552.

U.S. Final Official Action dated May 18, 2007 cited in U.S. Appl. No. 10/155,680.

U.S. Official Action dated May 30, 2007 cited in U.S. Appl. No. 09/906,467.

Blaheta et al., "Assigning Function Tags to Parsed Text," Morgan Kaufmann Publishers, Inc., 2000, pp. 234-240.

U.S. Office Action dated Jun. 28, 2007 cited in U.S. Appl. No. 09/841,206.

U.S. Final Office Action dated Jul. 12, 2007 cited in U.S. Appl. No. 10/184,298.

U.S. Office Action dated Jul. 13, 2007 cited in U.S. Appl. No. 10/154,630.

U.S. Office Action dated Jul. 20, 2007 cited in U.S. Appl. No. 09/841,265.

U.S. Final Office Action dated Jul. 26, 2007 cited in U.S. Appl. No. 10/164,960.

U.S. Office Action dated Aug. 10, 2007 cited in U.S. Appl. No. 10/179,810.

U.S. Office Action dated Sep. 10, 2007 cited in U.S. Appl. No. 10/179,438.

U.S. Final Office Action dated Sep. 27, 2007 cited in U.S. Appl. No. 10/608,267.

Malaysian Search Report dated Aug. 2, 2007 cited in Malaysian Application No. PI 20040265.

U.S. Appl. No. 11/924,856, filed Oct. 26, 2007 entitled "Providing Contextually Sensitive Tools and Help Content in Computer-Generated Documents".

U.S. Office Action dated Oct. 9, 2007 cited in U.S. Appl. No. 10/183,317.

U.S. Final Office Action dated Oct. 16, 2007 cited in U.S. Appl. No. 09/907,418.

U.S. Office Action dated Oct. 17, 2007 cited in U.S. Appl. No. 10/155,680.

U.S. Final Office Action dated Oct. 19, 2007 cited in U.S. Appl. No. 10/184,190.

U.S. Final Office Action dated Oct. 19, 2007 cited in U.S. Appl. No. 09/588,411.

U.S. Final Office Action dated Oct. 19, 2007 cited in U.S. Appl. No. 10/141,712.

U.S. Final Office Action dated Oct. 30, 2007 cited in U.S. Appl. No. 09/906,552.

European Communication dated Sep. 25, 2007 cited in European Application No. 03 014 181.6-1243.

Japanese Official Action dated Oct. 19, 2007 cited in Japanese Application No. 2003-128417.

Rubin, Charles, "Microsoft Word 2000 Official Manual," First Edition, Nikkei BP Soft Press, Inc., Aug. 2, 1999, pp. 215-217.

U.S. Final Office Action dated Dec. 7, 2007 cited in U.S. Appl. No. 10/426,446.

Russian Official Action dated Oct. 11, 2008 cited in Russian Application No. 2003118722.

Pershikov, V.I., "Explanatory Dictionary in Informatics," Finances and Statistics, Moscow, 1991 (in Russian with translated sections) 5 pgs.

U.S. Final Office Action dated Dec. 18, 2007 cited in U.S. Appl. No. 10/366,141.

U.S. Final Office Action dated Dec. 26, 2007 cited in U.S. Appl. No. 09/841,265.

U.S. Office Action dated Dec. 26, 2007 cited in U.S. Appl. No. 10/377,258.

U.S. Final Office Action dated Jan. 7, 2008 cited in U.S. Appl. No. 10/179,438.

U.S. Final Office Action dated Jan. 9, 2008 cited in U.S. Appl. No. 09/906,467.

David D. Lewis et al., "A Sequential Algorithm for Training Text Classifiers," Spring-Verlag New York, Inc., 1994, pp. 1-10.

Wei Ying-bin et al., "A New Technology ColdFusion of Realizing Dynamic Webpage," 2000, 6 pgs. (English language translation, pp. 1-6).

V. Doroth et al., "Modern Computer Vocabulary," St. Petersburg, BHV-Peterburg, 2001, p. 465 (with English language translation).

Rubin, C., "Microsoft Word 2000 Official Manual", First Edition, Nikkei BP Soft Press, Inc., Aug. 2, 1999, pp. 215-217.

M. Stowe, "XML in Excel and the Spreadsheet Component", Microsoft Corporation, Aug. 2001, 6 pgs.

C. Heinemann, "Cross-Reference your XML Data", Microsoft Corporation, Dec. 7, 1998, 6 pgs.

D. Obasanjo, "XML_Namespaces and How They Affect Xpath and XSLT", Microsoft Corporation, May 20, 2002, 19 pgs.

Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.

"XML Schema Part 2: Datatypes," W3C, May 2, 2001, http://www.w3.org/TR/2001/REC-xmlschema-2-20010502/, pp. 1-146 (separated into 2 documents - A & B).

Ghamrawi et al., "Collective Multi-Label Classification," ACM, 2005, pp. 195-200.

"The Spatial Smart Tag", Geomatic Technologies, Mar. 10, 2005, 2 pp.

Harmon, D., "Microsoft MapPoint 2002", Geoworld Quick-Take Reviews, Aug. 2001, 3 pp.

Irie R. et al., "Resources for Place Name Analysis", May 28, 2004, 4 pp.

Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.

Ivens, K., Office XP Smart Tags, Microsoft, Mar. 6, 2002, pp. 1-4.

Frye, C., Microsoft Office Systems: Step by Step, Microsoft Press, 2003 Edition, Sep. 3, 2003, pp. 1-6.

Sharon Oviatt et al., "Integration and Synchronization of Input Modes during Multimodal Human-Computer Interaction," CHI 97, Atlanta, Georgia, Mar. 22-27, 1997, pp. 415-422.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.

Hara, T. et al., "Inside Microsoft.NET-Complete Explanation, 'What Microsoft Aims For'", msdn magazine, No. 6, pp. 20-35, ASCII, Japan, Sep. 18, 2000, 19 pp.

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese - no translation yet).

"Adding Data from Other Source in Power Point 2002," Internet Article, the McGraw-Hill Companies, Inc., Dec. 21, 2002, http://web.archive.org/web/20021221085214/http://glencoe.com/ps/computered/pas/article.php4?articleID=437.

Koyaku, H. "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

C. Goldfarb, XML Handbook, $1^{st}$ Ed., Pearson Education, Japan, May 10, 1999, pp. 246-254 (no English translation).

S. Tanaka, "Verifying the XML Schema Definition, " XML Magazine, Shoeisha Co., Ltd. vol. 10, No. 3, Jul. 1, 2000, pp. 135-155 (no English translation).

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

Glover et al., "Inferring hierarchical Descriptions," ACM, 2002, pp. 507-514.

* cited by examiner

MECHANISM FOR DOWNLOADING SOFTWARE COMPONENTS FROM A REMOTE SOURCE FOR USE BY A LOCAL SOFTWARE APPLICATION

RELATED APPLICATIONS

This patent application is a continuation-in-part under 35 U.S.C. §120 of U.S. patent application Ser. No. 10/164,260 filed on Jun. 5, 2002, which is incorporated herein by reference.

TECHNICAL FIELD

This invention relates to a mechanism for downloading software components from a remote source for use by a software application.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alpha-numeric data. Such applications have a number of well-known strengths, including rich editing, formatting, printing, calculation, and offline editing.

With the advent of such useful software applications, it has become popular to develop and use a variety of intelligent documents where such documents may point to and download via a software application helpful solutions that enhance the performance of such documents. For example, a resumé document may be developed as a template with open fields for each section of the document such as the "experience" section or the "education" section. The document may point to a solution that provides helpful functionality. For example, after downloading a particular solution, a user of the document may be provided a tutorial on completing resumés, or the user may be provided helpful information as the user focuses an insertion point on certain fields of the document. For example, if the user focuses on the education section of the document, the user may be provided helpful information as to how many education entries are suggested.

Unfortunately, such systems typically provide a user with a static "one-size-fits-all" solution that is the same solution regardless of the user's profile including the user's identity, job description, location, or other information associated with the user that may affect the usefulness of a particular solution. Accordingly, there is a need for enabling users to download document solutions that are dynamically configured based on the user's individual profile.

Because of the growth of available document solutions, large corporate, educational, civic, government, and other organizations may desire to make great numbers of document solutions available to their users. Unfortunately, associating great numbers of document solutions to individual user computers or software applications is inefficient, requires excessive computer memory, and requires frequent updating. Accordingly, there is a need for a collection of document solutions that contains information necessary for users to obtain desired or required document solution components.

It is with respect to these and other considerations that the present invention has been made.

SUMMARY OF THE INVENTION

The present invention provides methods and systems for dynamically configuring document solutions and for obtaining desired or required components of such document solutions for use with computer-generated documents. According to one aspect of the invention, if a document is associated with a document solution, a query is made to a local namespace (schema) library to determine whether the document solution has already been downloaded to the user's computer or is otherwise available remotely for use in providing the desired solution to the document. If the solution is not presently available, or if the solution requires updating, the document may point to a manifest of document solutions. If the document points to a manifest of document solutions, a request for the components of the desired solution is sent to the manifest. Along with the request, information about the user is also passed to the manifest. According to one aspect of the invention, the manifest is configured as an active server page. At the manifest, identification information for the user is utilized to query a user database to determine a profile of the user such as the user's job description, location, security clearance, and the like. Based on the user's profile, the document solution is configured dynamically to include solution components most helpful to this particular user. A configured solution is passed back to the user for use with the user's document.

According to another aspect of the invention, a manifest collection is provided for serving as a repository of document solution location information for many different namespaces (schemas) that may be associated with one or more user documents. Rather than downloading great numbers of document solutions to a user's computer, the user's computer is configured to point to a uniform resource locator associated with a manifest collection. When a user document references a particular namespace, such as an Extensible Markup Language (XML) namespace associated with an XML markup solution applied to the document, the user's document queries the manifest collection for a referenced solution. At the manifest collection, one or more namespaces associated with the user's document are used to locate a solution identification and location. Once the identification and location of a particular solution is obtained, components of that solution may be obtained from one or more remotely maintained solution manifests as described above.

These and other features, advantages, and aspects of the present invention may be more clearly understood and appreciated from a review of the following detailed descriptions of the disclosed embodiments and by reference to the appended drawings and claims.

BRIEF DESCRIPTION OF THE DRAWINGS

FIG. 3 is a computer screen display of a software application graphical user interface through which is displayed a document and associated contextually sensitive actions and help content according to an embodiment of the present invention.

DETAILED DESCRIPTION

Figure 1:
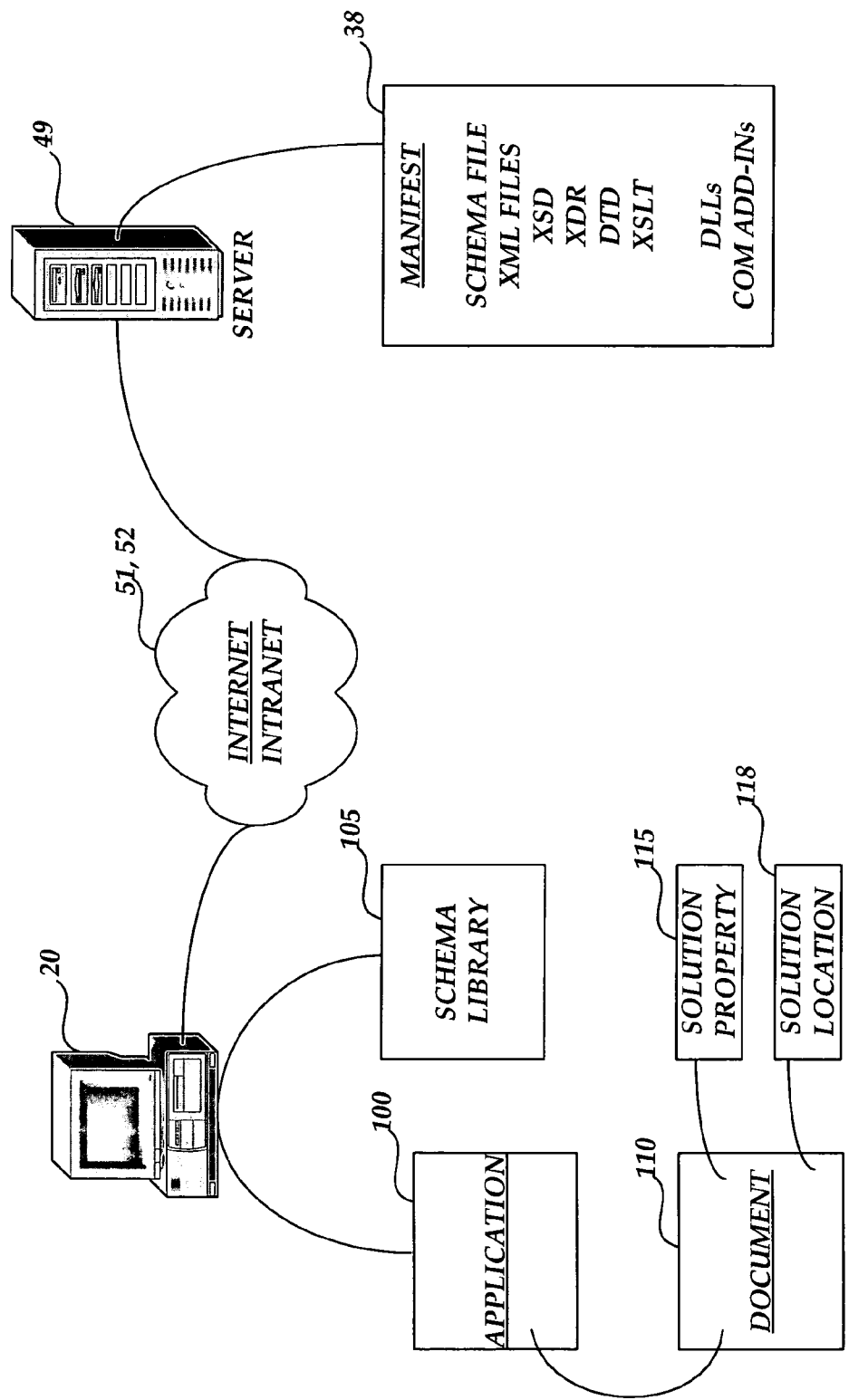
FIG. 1 is a simplified block diagram illustrating a client-server architecture for use in conjunction with an embodiment of the present invention.

Referring now to the drawings in which like numerals refer to like parts or components through the several Figures. FIG. 1 is a simplified block diagram illustrating a client-server architecture for use in conjunction with an embodiment of the present invention. All components and files necessary to operate or fully implement the functionality or solutions available to a software application 100 are identified and are assembled on a local library of software components in the schema library 105. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein.

All components and files that may be utilized to update or add to functionality available to the application 100 are identified and are assembled on a manifest 38 which may be located in a remote library of software components on a remote web server 49 accessible by the user via the user's computer 20. If the user is informed that the components on her client-side computer 20 should be updated, or that corrections or improvements to existing components are available, or that new functionality is available that will transform the user's existing application 100 and document 110 into a "smart" application and "smart" document, the user may connect to the web server 49 via the Internet 51, or via an intranet 52, to download the required components. Alternatively, the user may connect to the web server 49 via any suitable distributed computing environment, including wireline and wireless telecommunications networks, for allowing the user to connect to the web server 49 to download files from the manifest 38.

The manifest 38 may include all components, including dynamic-link libraries (dlls), component add-ins, Extensible Markup Language (XML), schema files and all associated XML files required by a software application for operating properly or required for improving, or adding, functionality to the software application 100. According to an embodiment of the present invention, the manifest 38 may also include information helpful to the end user, or to the end user's computer, for installing the downloaded components. For example, the manifest 38 may include information specifying the type for a given dll so that the client-side computer 20 can properly register the dll including any need for specific registry keys for properly registering the dll.

A schema may be attached to the manifest 38 to define permissible data content, data type and data structure of the manifest as a file and for associating the manifest with files, documents and applications that may call the manifest 38 for obtaining a download of required components. For purposes of example only and not for limitation of the invention described herein, the following is an example XML-based schema that may be attached to the manifest 38 for associating the manifest with files, documents and applications that may call the manifest 38 for obtaining a download of required components.

If the user has opened a software application 100 that requires the functionality of various components to transform the user's document 110 into a "smart" document, as described below, the mechanism of the present invention may be used to download all components required for that operation. In that case, an XML schema that describes the type(s) of files and data structures that together make up a solution to transform the user's document 110 into a "smart" document, as well as information about registering those components and installing them on the user's computer 20 may be stored on the manifest 38.

For example, if the user receives a document, such as a template, for the preparation of a resume that "points" to a solution for providing helpful information, and actions, associated with completing the text and data fields of the template, the template or document received by the user may point to a remotely stored manifest 38 so that the user may download all files necessary for fully implementing the solution referred to by the document received by the user. For a detailed description of a method and system for creating, implementing and using "smart" documents such as the document 110, illustrated in FIG. 3, see U.S. patent application entitled "Providing contextually sensitive tools and help content in computer-generated documents." Ser. No. 10/164,960, filed Dec. 11, 2003, which is incorporated herein by this reference as if fully set out herein.

Once the manifest 38 is created, and all of the necessary files are listed to implement a given solution, or to correct or improve the performance of a given application, a reference to the solution or updates may be made in the document, such as a word processing document, or spreadsheet document utilized by the user on the client-side computer 20. The manifest of files and solutions may be referred to by a solution or manifest ID to allow the user's client-side application and documents to point to and obtain information from, the remote manifest. The solution ID associated with software components pointed to by the document or application are stored in a solution property 115 attached to the document 110.

The location of the manifest 38, including required components and desired solutions, is referred to according to the solution location 118. The solution location 118 may include the URL of the manifest 38 on the remote web server 49. If the user only has the document, as in the case where the user has received the document from a friend via electronic mail, the application 100 may call the web server 49 via the solution location 118, and by utilizing the solution ID from the solution property 115, the application may obtain the manifest 38 to determine what components must be downloaded, installed, registered, and implemented to provide the user with required or desired functionality. Now, the user has the document 110 and a set of installed "ready to run" files and other components that the software document 110 needs to enable the proper operation of the software application 100 or to enable the application 100 to transform the document 110 into a "smart" document. Advantageously, the requirement to receive an installation package from the software developer containing software repairs or "patches" or containing necessary functionality to improve the performance of original functionality of the application is avoided.

Figure 2:
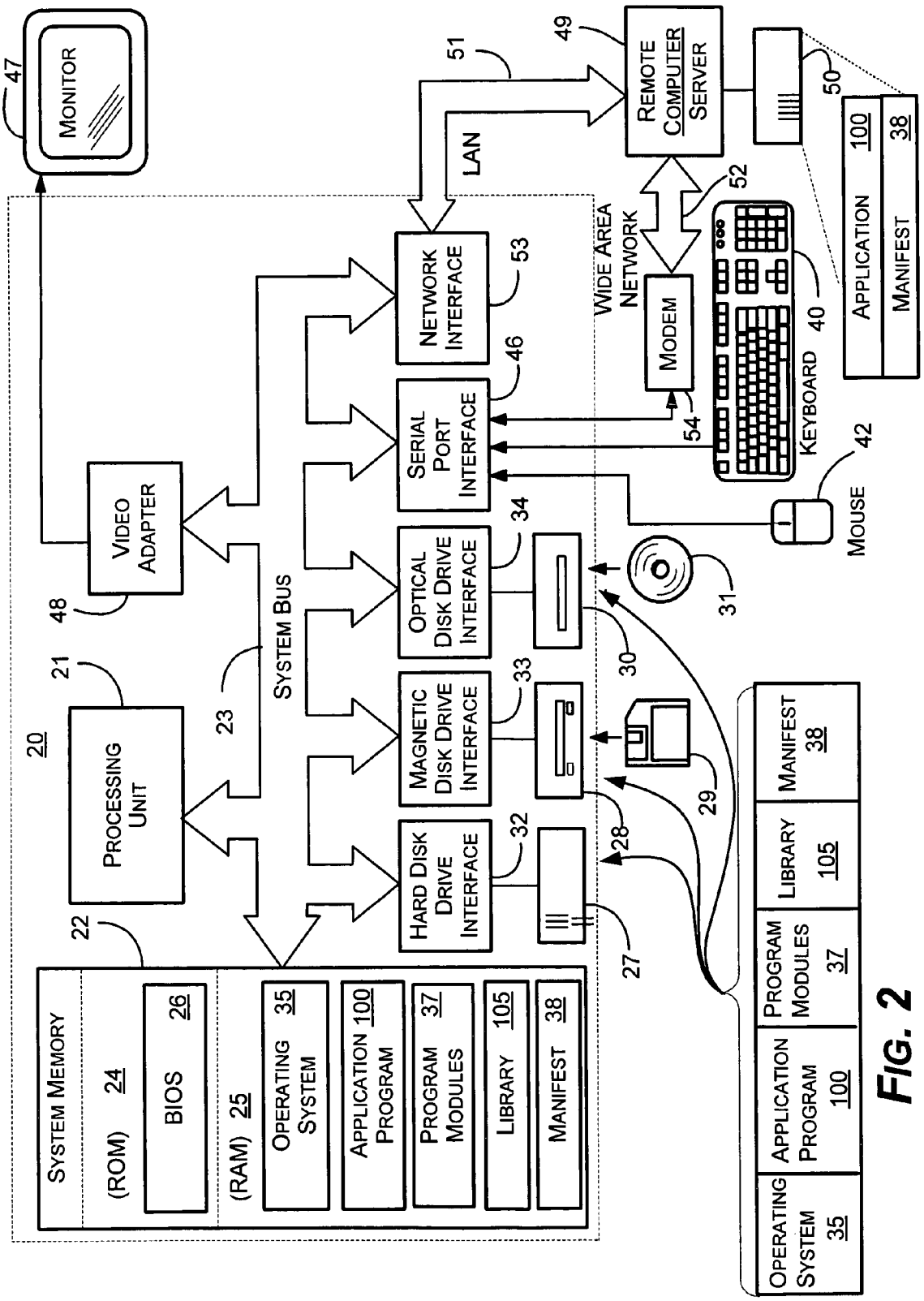
FIG. 2 is a block diagram of a computing system and associated peripherals and network devices that provide an exemplary operating environment for the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3:
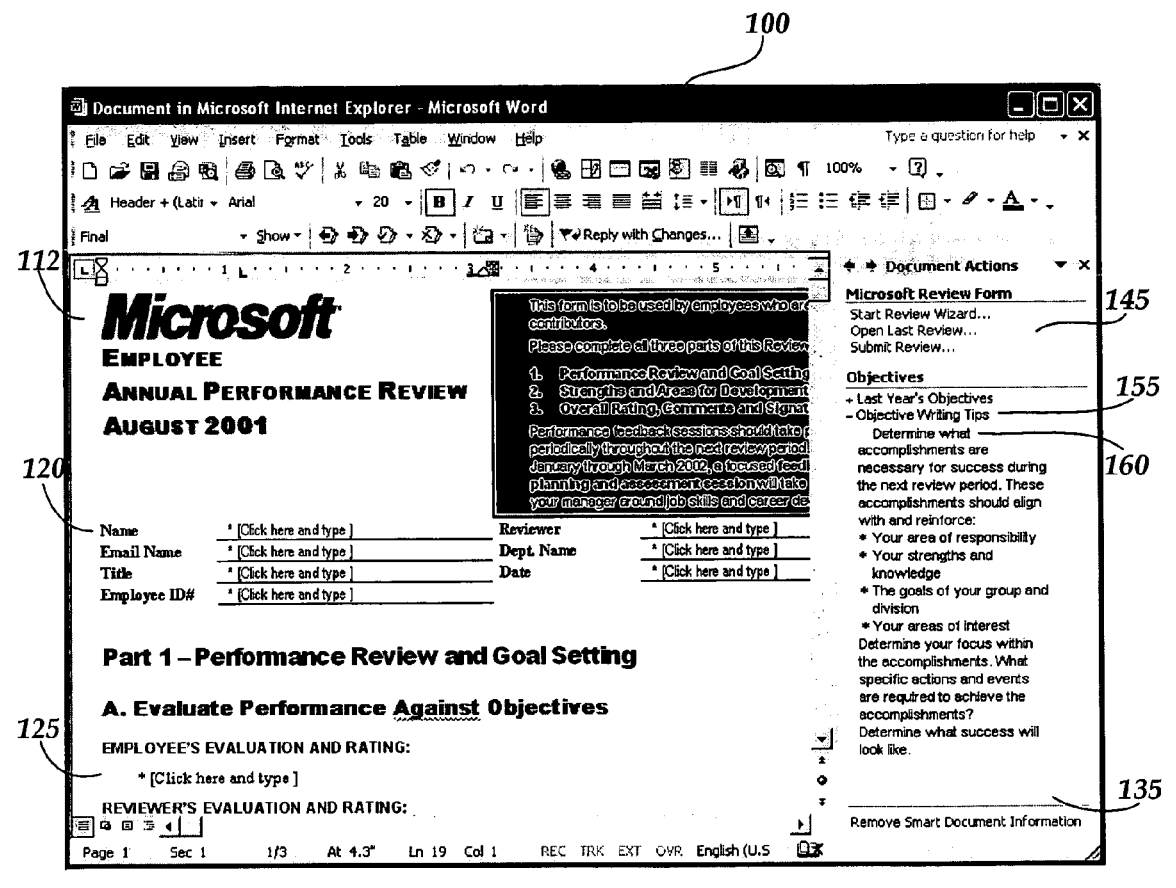

FIG. 3 is a computer screen display of a software application graphical user interface through which is displayed a document and associated contextually sensitive actions and help content according to an embodiment of the present invention. The document called "Microsoft Employee Performance Review" (reference numeral) 112 illustrated in FIG. 3 represents a "smart" document that may point to functionality that may be downloaded from the manifest 38. The document 112 illustrated in FIG. 3 is described for purposes of example only and is not limiting of the invention described herein. The word processing application 100 provides typical functionality associated with a word processor accessible via drop down menus such as, File, Edit, View, Insert, Format, etc. The document 112 is displayed in the work area of the application 100, and a document actions pane 135 is illustrated to the right of the document 112.

When the user places her computer cursor within a particular section of the document 112, for example the "objectives" section 125 illustrated in FIG. 3, the user is provided with actions and help content in the document actions pane 135. For example, if the user places her computer cursor in the "objectives" section 125, the user may be provided with "Objective Writing Tips" 155 shown in the document actions pane 135. Selection of the "Objective Writing Tips" 155, as illustrated in FIG. 3, causes a display of "Objective Writing Tips" text 160 that provide the user with helpful information as to how to complete the "objectives" section in the performance review document 112, illustrated in FIG. 3. If the user moves the cursor to a different section of the document, for example the personal information section 120, information provided in the document actions pane 135 will be provided to give the user assistance with the completion of the personal information section 120.

In addition to helpful information to assist the user, a variety of document actions 145 are provided. For example, the "Submit Review" action may allow the user to submit the completed document 112 to her supervisor or to her employee after completion of the document. The "Open Last Review" action may allow the user to open the last performance review so that she may determine whether she completed her objectives as set forth in the last review. If the document in use by the user is some other type of document, for example a resume document, helpful information in the document actions pane might include information on preparing the "education" section, the "experience" section, and/or the "personal information" section.

According to the present invention, and as described in detail below, when a user focuses on a particular portion of the document 112, such as the "objectives" section of the performance review illustrated in FIG. 3, a solution property 115 points the document to the "objectives" section help solution illustrated in the document actions pane 135. The solution location 118 provides the document 112 and the application 100 with the location of the components, dlls, or XML files necessary for implementing that solution. As should be understood, exemplary components may include components for drawing the document actions pane 135, components for displaying the information associated with the particular context, in this case the "objectives" section, and components for executing document actions such as "Submit Review" action 145. If the components needed by the application 100 and document 112 to provide the "smart" functionality described above have not been downloaded to the user's computer 20, then these components may be downloaded to the computer 20 in accordance with the present invention as described below.

Figure 4:
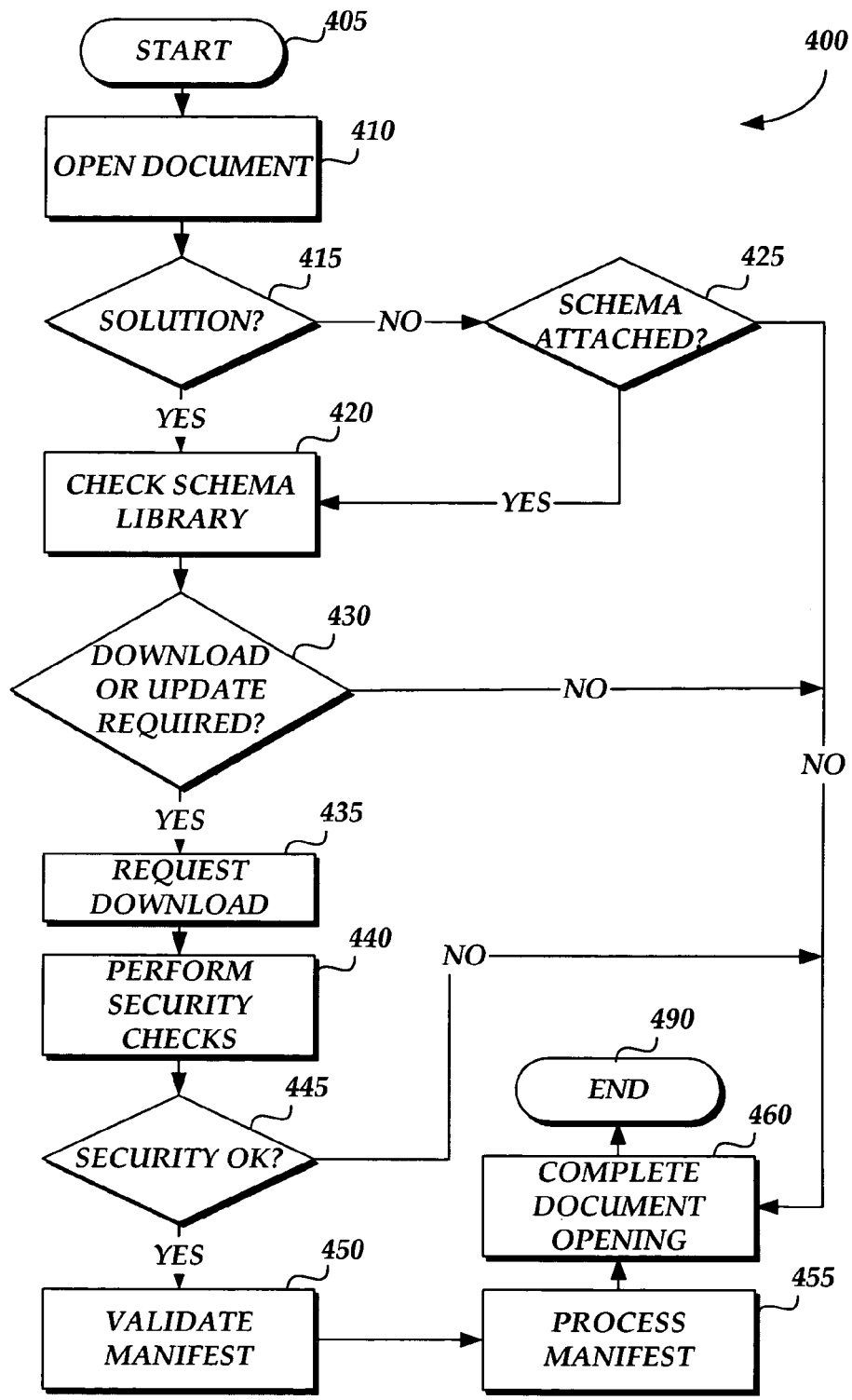
FIG. 4 is a flow chart illustrating a method for downloading components required for operating and for providing functionality to a client-side software application.

FIG. 4 is a flow chart illustrating a method for downloading components required for operating and for providing functionality to a client-side software application. As described above, the embodiments of the present invention provide for downloading all components, files, sub-routines, Extensible Markup Language files, and file implementation information necessary for the operation of the software application 100 on the user's computer 20. The embodiments of the present invention also provide for downloading all necessary components, files, XML schema, and associated XML files required by an application 100 for transforming a document 110 into a "smart" document.

The method 400 for downloading required components and files to the user's computer 20, begins at start step 405, and proceeds to step 410 where the application 100 is booted by the user, and the document 110 is opened for editing by the user. According to an embodiment of the present invention, the document 110 opened by the user may be any document that points to required components and files for operation of the document 110 via the application 100, or the document may be a "smart" document that points to a solution that may be downloaded to provide enhanced functionality to the document, as described above with reference to FIG. 3.

At step 415, the application 100 determines whether the document 110 points to or refers to components, sub-routines, or files that are necessary for the operation of the application 100, or whether the document 110 points to a solution that may be downloaded to the user's computer 20 to provide additional functionality to the application 100 for editing the document 110. According to an embodiment of the present invention, a schema is attached to a document 110 that defines permissible data content, data type and data structure from the document. The document is structured to associate the document with the schema. A solution comprising components and files needed to provide functionality to the application or to transform the application into a "smart" document is associated with the document structure.

According to another embodiment of the invention, an Extensible Markup Language (XML) schema is attached to the document to define permissible data content, data types and data structures for the document. Particular portions of the document are annotated with XML structure associated with the schema. A solution comprising a plurality of software components is associated with XML elements making up the XML structure. The document is enabled to call the solution to obtain functionality provided by the plurality of software components assembled on the manifest 38 upon initiation of editing the document within an XML element associated with a particular solution.

Figure 5:
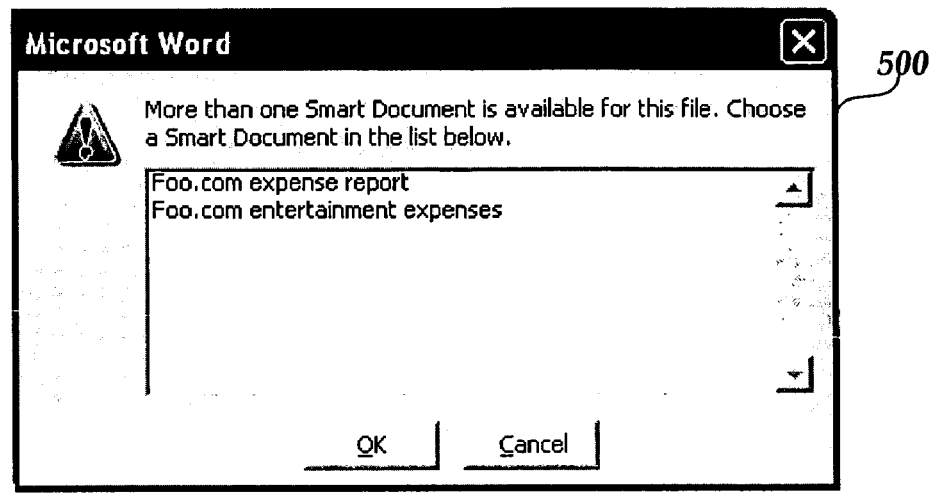
FIG. 5 illustrates a computer-generated dialog box for offering multiple document solutions to the user.

If the document 112 points to various components and files necessary for the operation of the application 100 and for editing the document 112, or if the document points to a solution that may be downloaded to transform the document into a "smart" document, the method proceeds to step 420, and the application 100 checks the schema library 105 resident on the user's computer 20 for the presence of the necessary components or files. If the document includes solution properties pointing to more than one solution, the user of the document may be prompted (e.g. the dialog box 500, illustrated in FIG. 5) to select one of the solutions for downloading from the remote server.

Referring back to step 415, if the document does not refer to a solution for transforming the document into a "smart" document, the method may proceed to step 425, where a determination is made as to whether a schema has been attached to the document. If the document has an attached schema, but no reference to a particular solution, the method proceeds to step 420, and the schema library 105 is checked for the presence of components associated with the schema attached to the document 110. If a determination is made that the document does not refer to any required components or files, or that the document does not have an attached schema, the method proceeds to step 460, and the document is opened in accordance with normal document opening procedures according to the document application 100.

Referring back to step 420, at the schema library 105, a determination is made as to whether the schema library 105 includes files associated with the application 100 and the document 110. A determination as to whether a solution is present in the schema library 105 that is referred to in the document 110 is made by looking for component or solution IDs referred to in the solution properties 115 in the document 110.

Figure 6:
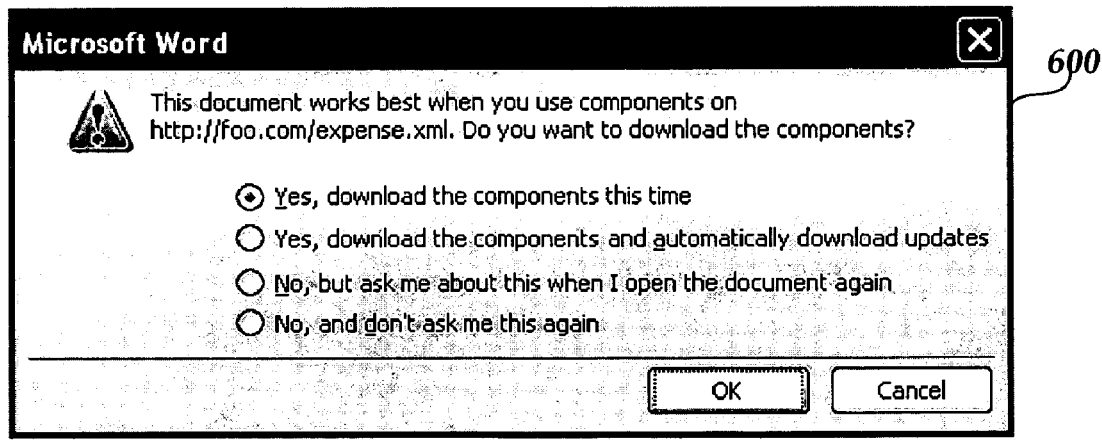
FIG. 6 illustrates a computer-generated dialog box for assisting a user with downloading components required by a software application.

At step 430, a determination is made as to whether a download of components, files, sub-routines, or information related thereto should be downloaded to the user's computer 20 to update existing components or to add additional functionality to transform the document 110 into a "smart" document. In order to make the determination as to whether components should be updated, or as to whether additional functionality should be downloaded from the manifest 38, the user may be provided with a prompt, such as the dialog box 600, illustrated in FIG. 6. The dialog box may inform the user that components necessary for the proper operation of the application 100 may have been updated or repaired recently, or that the document she is currently editing will work better if the user downloads components from a given web server site. As shown in the dialog box 600, the user may be provided with a variety of options including acceptance of a download of components, acceptance of automatically downloading future updates, or the user may decline the downloading of updates or components.

A registry key may be written into the computer's registry so that when the application boots, a query can be sent to the manifest 38 via the remote server 49 to determine whether new functionality has been added to the manifest 38 that is associated with the application 100 or with solutions being used by the application 100 to transform the application into a "smart" document. Alternatively, the manifest 38 may include a timing mechanism that contacts the user after a set amount of elapsed time to notify the user to check for updates to files or functionality contained on the manifest 38. The amount of time between checks for updates to the manifest 38 may be set by the creator of the manifest 38 or by the user of the application 100, as described below. Alternatively, the application 100 can be programmed to call or "ping" the server 49 on some regular frequency to determine whether any software component updates or additions are available. Alternatively, the user may request software component updates to be downloaded from the manifest 38 upon user demand, or the user may choose to have updates downloaded on some regular frequency, such as application boot-up, or daily, weekly, etc. According to an embodiment, the user may be provided with a user interface for choosing the frequency of download from the manifest 38.

Figure 7:
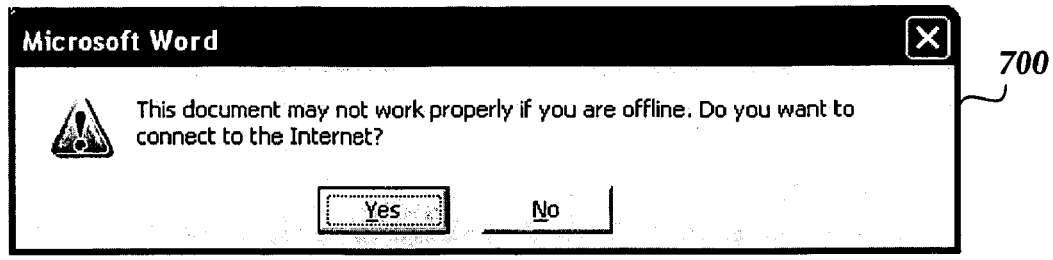
FIG. 7 illustrates a computer-generated dialog box for prompting a user of the need to connect to the internet for downloading components according to an embodiment of the present invention.

At step 435, if the user decides to download updates to existing files or components or new functionality to transform the document 110 into a "smart" document, the user requests the download of the suggested files or functionality, and the application 100 connects to the remote server 49 to request the required files or updates from the manifest 38. In order to connect the application 100 to the remote server 49 to obtain downloaded information from the manifest 38, the application 100 may launch an instance of an Internet browser capable of connecting the user's computer 20 to the remote server 49. Alternatively, the functionality may be integrated into the application 100 for connecting to the remote server 49 in the same manner as an Internet browser would connect to the remote server 49 to download information directly to the application 100 via the user's computer 20. If the user's computer 20 is not adapted for on-line communication, a prompt such as the dialog box 700 illustrated in FIG. 7 may be provided to the user to inform the user that the document may not work properly if the user is off-line.

As should be understood, the call made from the application 100 to the manifest 38 located on the remote server 49 may be made based on a uniform resource locator (URL) designated for obtaining updates to existing files or new functionality and attached to the document at the solution location 118, illustrated in FIG. 1. Alternatively, the user may have a set of URLs from which to obtain updates to software components or additional functionality, and the user may enter one or more of those URLs in response to a prompt informing the user that updating the software components provisioned for her application 100 may be helpful. Alternatively, the user may decide without being prompted to cause the application 100 to call the manifest 38 to obtain software component updates and additions. According to this embodiment, a function tool may be provided in the application 100 that allows the user to enter the URL of a manifest 38 from which the user desires to obtain software component updates or functionality additions.

Figure 8:
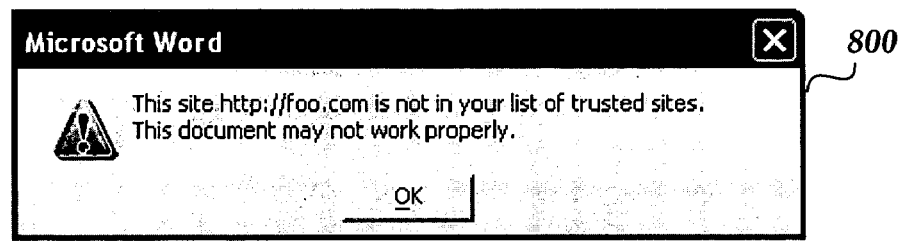
FIG. 8 illustrates a computer-generated dialog box for warning a user of a potential security risk associated with downloading components to the user's computer.
Figure 9:
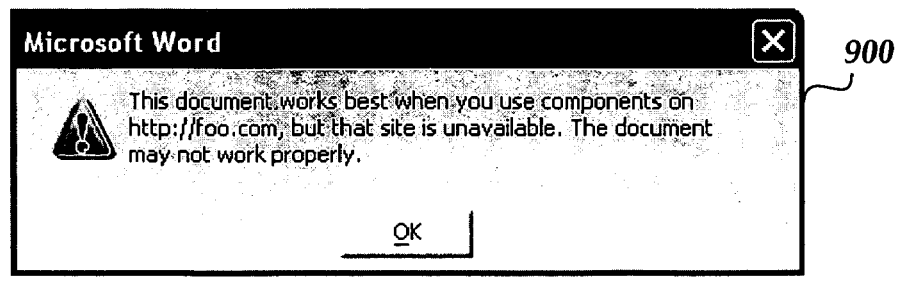
FIG. 9 illustrates a computer-generated dialog box for alerting a user of a problem associated with downloading components required by the user's software application.

Once the user has requested the download of software component updates or functionality additions for use by the application 100, the method proceeds to step 440 and a number of security checks are performed to ensure that the user receives the downloaded files and updates from a trusted source. If the document refers to a manifest 38 via a server site that is on the user's list of trusted sites, or if the manifest is requested from a site on the user's trusted intranet system, then the download of the requested or accepted files or updates may be performed. If the URL at which the manifest 38 is located is not a trusted site or in the user's trusted Intranet system, the user may be notified with a prompt such as the dialog box 800, illustrated in FIG. 8, to notify the user that the site being called is not on the user's list of trusted sites or is not coming via the user's trusted intranet system. The user may then choose to either accept a download of information from the manifest 38 or decline the download in response to the prompt. If the document refers to a manifest 38 that is on a trusted site or that is available via a trusted Intranet system, but where the site containing the manifest 38 is not available, the user may be notified with a prompt such as the dialog box 900 illustrated in FIG. 9 that the site is currently unavailable and that the download of information is likewise not available.

An additional security check that may be performed after the download, but prior to installing components, includes preparing a checksum value of the information provided by the manifest 38 and comparing that to a checksum value prepared for the downloaded information at the user's computer 20. If the two values do not match, the installation to the user's computer 20 is prevented because the variation in the checksum values may be an indication that unauthorized tampering with the contents of the downloaded files occurred in transit to the user's computer 20.

In addition to the foregoing security checks, digital signatures may also be utilized to check the security of files downloaded from the manifest 38. That is, files contained on the manifest 38 may be enhanced with a digital signature of the creator or administrator of those files that may be checked at the remote server 49 or at the user's computer 20 against a list of trusted digital signatures prior to downloading and/or installing information from those files. If any of the foregoing security checks fail to ensure the validity and security of the files contained in the manifest 38, the method proceeds to step 460, and document opening is completed without downloading any additional components or file updates. That is, the document opens and operates without the benefit of new functionality or updates to existing functionality that may be available from the manifest 38. Alternatively, the user may override the security system and accept the downloaded information even if the security check indicates that the information is not coming from a trusted site if the user is otherwise confident that the downloaded information may be trusted.

Referring back to step 445, if the security checks pass, the method proceeds to step 450 where a validation of the contents of the manifest 38 is performed. Before downloading components or information from the manifest to the user's computer 20, a comparison is made between the components and information contained in the manifest 38 (pointed to by the document 110) and the components and information already present in the schema library 105. If the components and information on the manifest 38 does not differ from the components and information already available to the application via the schema library 105, then the download from the manifest 38 may be avoided.

The validation of the manifest 38 includes a determination of which components or information regarding those components are pointed to by the document 110 via the application 100. That is, a solution referred to by the document 110 may require additional functionality, and the solution may point to particular components contained on the manifest 38, but not point to all components contained on the manifest 38. Accordingly, at step 450, a determination is made as to the number of components and the content of information related to those components that should be downloaded to the user's computer 20 for integration with the application 100.

At step 455, the manifest 38 is processed. Processing the manifest 38 includes actually downloading files, components, subroutines, and related information pointed to by the document 110 or application 100. Once the required files are downloaded to the user's computer 20, those files are installed and registered with the operating system of the computer 20. As should be understood by those skilled in the art, any required registry keys or set-up actions necessary to ensure that the downloaded files properly correspond with the application 100 to provide the required functionality are performed at step 455. After all required files are downloaded from the manifest 38, opening the document 110 is completed with the additional or updated functionality provided by the downloaded file updates or file additions. The method ends at step 490.

Once the document 112 is opened after the download of component updates or additions, the user of the document now has all available functionality downloaded onto the user's computer 20. If the document is a "smart" document as illustrated with reference to FIG. 3, the document will provide the user with all the normal functionality required for operating the document, and additionally, the user will have useful help content and document actions based on the editing context within the document. For example, if the user has opened a resumé template, the user may receive help content and document actions based on the position of the user's computer cursor in a section of the document. In addition to pointing to the solution ID for obtaining the solution for use by the document, the document will point to the solution location from where the software components or software component upgrades may be downloaded to upgrade or add to the functionality in use by the document. Accordingly, with the present invention, the user may readily obtain downloaded updates and additions to the functionality available for use with the document being edited.

Moreover, if the user would like to send the document to a second user, there is no need to send the second user an installation package containing all the software components necessary to give the document the enhanced or "smart" functionality. Once the second user opens the document, the second user will be notified that the document will work more efficiently if the user downloads software components from the manifest 38, as discussed with reference to FIG. 4. If the downloaded information is accepted, the document will then have all the available functionality on the second user's computer 20 that it had on the computer of the first user.

Figure 10:
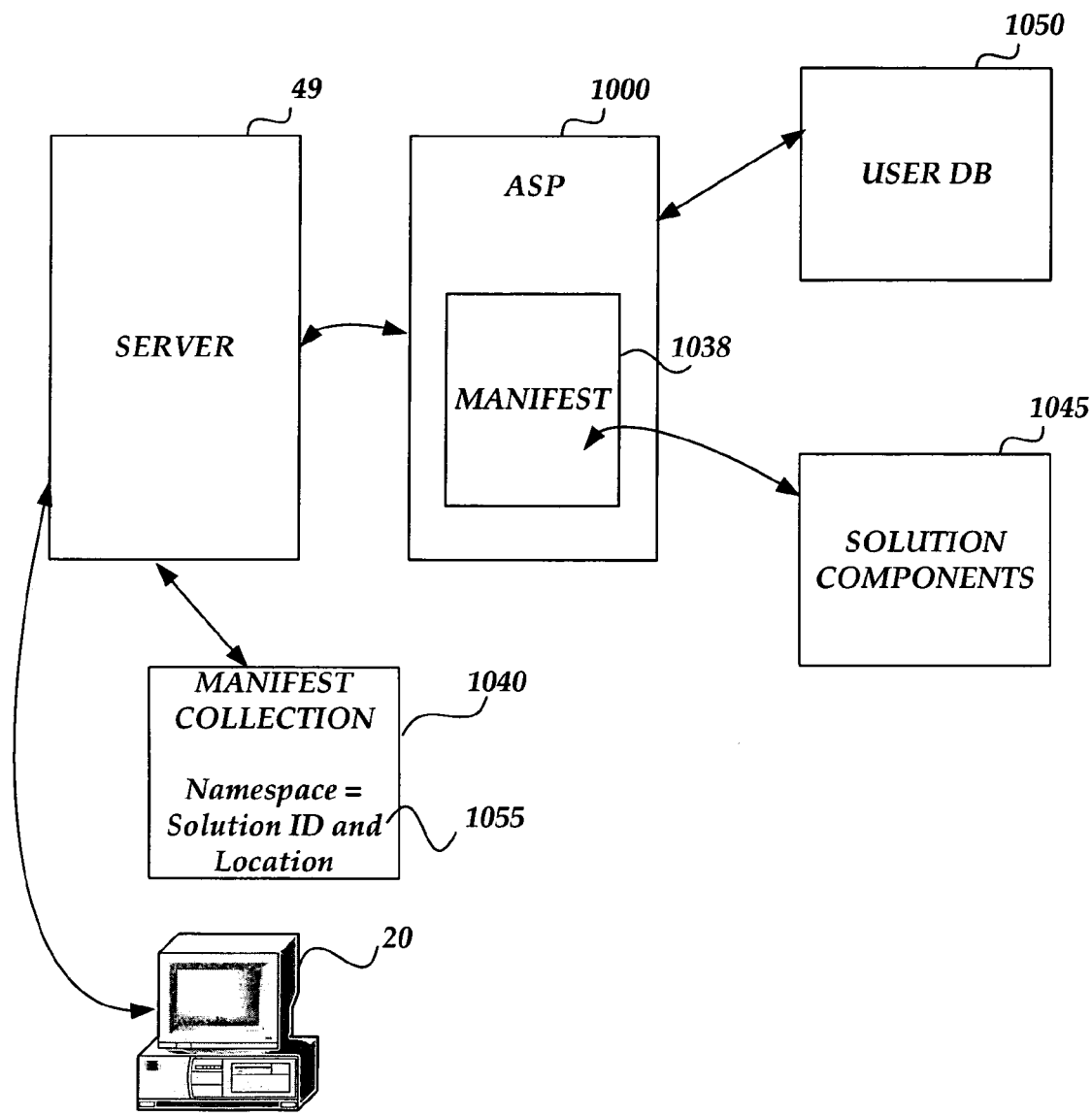
FIG. 10 is a block diagram illustrating a system architecture for use in conjunction with an embodiment of the present invention showing interaction between a user's computer and a remotely maintained manifest and manifest collection.

As described above, with reference to FIG. 1, a manifest may be utilized for obtaining software components for enhancing a software application or for providing a solution to a document to make the document more intelligent or "smart." According to an alternate embodiment, a manifest may be utilized for dynamically configuring a document solution based on information obtained about the user of the document. FIG. 10 is a block diagram illustrating a system architecture for use in conjunction with an embodiment of the present invention showing interaction between a user's computer and a remotely maintained manifest and manifest collection. Referring to FIG. 10, according to this embodiment of the present invention, when a user obtains or creates a document that references or points to a document solution requiring that the solution or the components of the solution be obtained from the manifest 1038, a request is sent from the user's document via the user's computer 20 to the manifest 1038 via the server 49. According to this embodiment of the present invention, the manifest 1038 resides in an Active Server Page 1000 having computer executable instructions sufficient for dynamically configuring a desired or required document solution based on information obtained about the user of the document solution.

When the request is forwarded from the user's document to the manifest 1038 to obtain the desired or required document solution, identification of the user is also sent to the manifest 1038. At the manifest 1038, operating in the active server page 1000, the manifest 1038 passes a query to the user database 1050 to obtain profile information for the user based on the identity of the user. According to embodiments of the present invention, the user database may be in the form of an active directory database. In response to the database query to the user database 1050 user profile information such as the user's job title, the user's work location, the user's educational background, or any other information available concerning the user is passed to the manifest 1038.

Based on information obtained from the user database 1050, the manifest 1030 obtains solution components 1045 for dynamically configuring the solution requested by the user for the user's document. For example, consider that a first user opens an employee review form which points to a document solution that may be obtained from the manifest 1038. If the user profile returned from the user database 1050 indicates that the user is a human resources manager, the manifest 1038 may obtain solution components 1045 for dynamically configuring and tailoring the document solution for use by a human resources manager. For example, one solution component may provide help functionality for assisting the human resources manager in completing fields of the employee review form associated with human resources issues. On the other hand, if a second user utilizing the same employee review form requests a document solution from the manifest 1038, and the user profile for the second user indicates that the second user is a training manager, a different document solution may be configured by the manifest 1038. For example, solution components 1045 may be assembled by the manifest 1038 such that the resultant document solution adds additional fields to the employee review form for completion by a training manager or which provide help functionality to the training manager for rating the training performance of a given employee. Accordingly, instead of the two different users receiving the same document solution, each user receives a document solution that is tailored to their needs based on profile information provided to the manifest 1038 about the individual users.

In cases where a user receives a document, such as a template associated with one or more document solutions, by electronic mail distribution, copying from a shared file, or some other location apart from receiving the document and document solution from the manifest 1038, some software applications operate security systems causing those applications not to trust such a document if the document is not installed by the user in an appropriate location. For example, some software applications have a particular memory location for storing templates. If the user imports a template document from some external source not via the manifest 1038, as described above, the template document and the document solution may not operate properly if the code of the software application cannot locate the template and the associated solution, particularly if the manifest processing code of the software application expects the template document to reside in a particular location.

According to the embodiments of the present invention, when a solution designer builds a document solution, such as a template document, the solution designer adds a property to the document that identifies the document as being part of or associated with a document solution. When a user subsequently opens the components of the document solution or a document based on the document solution, the software application detects the presence of the property added to the document by the solution designer. The software application then checks to see if a solution is referenced by the document. If a solution is referenced by the document, a solution directory is checked to see if this document and solution is presently in the solution directory of the software application. If the same document solution, such as a template, is already present, a comparison is performed of the two document solutions, and the older version of the document solution is replaced by the newer version of the document solution in order to allow the user to benefit from updates to the document solution. Now, the document solution obtained or received by the user is saved to a location expected by the software application and manifest processing code associated with the software application for processing instructions to and from the manifest 1038 and for processing information received from the manifest 1038 such as the document solution.

Referring still to FIG. 10, a manifest collection 1040 containing one or more namespace/solution pairs 1055 is illustrated. According to embodiments of the present invention, many entities such as large corporations, large educational institutions, large civic or government organizations, as well as individual users may maintain many documents associated with document solutions, and moreover, document solutions for the numerous documents maintained by such entities and users may be updated frequently. For example, a large shipping organization may have tens or hundreds of shipping and purchase order forms annotated with document solutions, such as Extensible Markup-Language (XML) based document solutions each pointing to one or more XML namespaces (schemas) for defining the operational and structural rules associated with markup structure applied to the document in association with the document solutions. If an organization attempts to associate each of the numerous document solutions for all the available namespaces potentially referenced by individual documents onto each user's computer 20, excessive memory space will be required, inefficiencies will be increased, and frequent updating required will be cumbersome and time consuming.

According to embodiments of the invention, the manifest collection 1040 contains a listing of namespace/solution pairs 1055 for directing a document to a document solution maintained at one or more manifests 1038. The manifest collection 1040 serves as a central repository for maintaining a listing of solutions for all the different namespaces referenced by documents maintained and operated by the organization. On each user's computer 20, a registry key is designated for pointing the user's computer 20 to a uniform resource locator (URL) associated with the manifest collection. If the user opens a document referencing a document solution associated with one or more namespaces, the document may point to the URL of the manifest collection via the registry key set on the user's computer 20 and pass the name of a given document namespace to the manifest collection 1040.

At the manifest collection 1040, the namespace is compared against namespace/solution pairs to determine if a matching namespace is in the manifest collection. If the namespace passed from the user's document matches a particular namespace/solution pair 1055, the solution identification and location for the namespace/solution pair are utilized to locate a particular document solution at the manifest 1038 for returning to the user for application to the user's document. According to an embodiment of the present invention, if a namespace from the user's document matches a namespace/solution pair 1055, an XML file is returned which describes a mapping of namespace uniform resource identifiers (URI) to a location of a manifest 1038 for obtaining desired or required document solutions. Accordingly, the organization operating the manifest collection 1040 may make new or updated solutions available to all its users without the need for updating each user's software applications, documents, or computer. For example, if a given document solution associated with a given document namespace requires updating, the organization may obtain the updated document solution referenced by a given namespace/solution pair 1055. When a given user's document subsequently references that namespace/solution pair, the user will obtain the updated document solution without additional user input.

Figure 11:
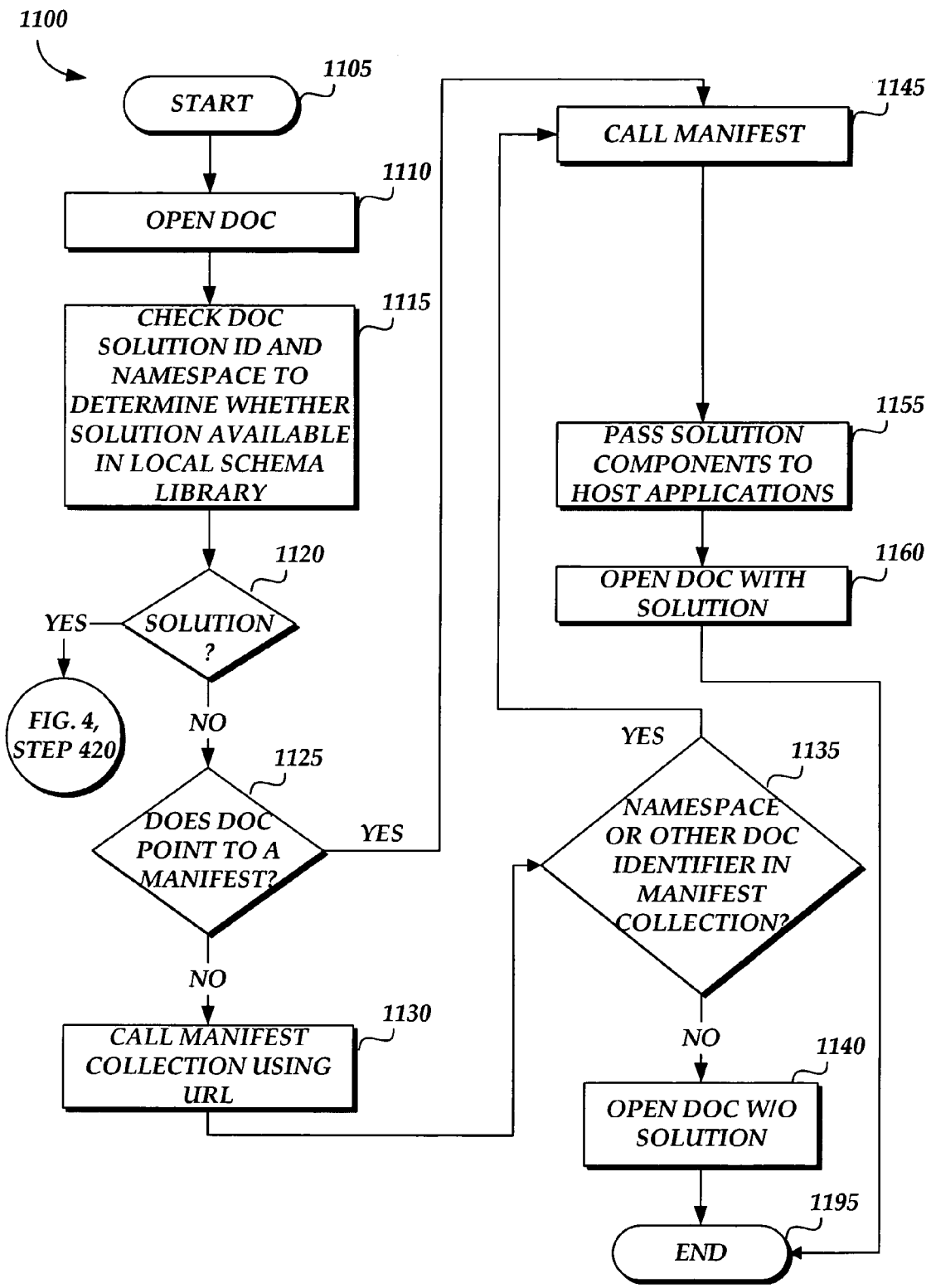
FIG. 11 is a flowchart illustrating a method for obtaining a dynamically configured document solution for use in conjunction with a user document according to embodiments of the present invention.

FIG. 11 is a flowchart illustrating a method for obtaining a dynamically configured document solution for use in conjunction with a user document according to embodiments of the present invention. Referring to FIG. 11, an example operation of the manifest 1038 and manifest collection 1040 described above with reference to FIG. 10 will be described. The method 1100 begins at start block 1105 and proceeds to block 1110 where a user opens a document, for example, an employee review template, at the user's computer 20. At block 1115, whether the document contains a solution ID and namespace associated with a document solution is checked. If so, a determination is made following decision block 1120 as to whether a solution matching the solution ID and namespace is available in a local schema library 105 as described above with reference to FIGS. 1 and 4.

If the required solutions may be found in the user's local schema library 105, the method proceeds as described with reference to FIG. 4, block 420. If the required solution is not available from the user's local schema library 105, the method proceeds to block 1125, and a determination is made as to whether the user's document points to a manifest 1038, as described above with reference to FIG. 10. If so, the method proceeds to block 1145, and a call is made to the manifest 1038 along with identification information for the user for obtaining a dynamically configured document solution tailored for this particular user.

At block 1155, the solution components obtained by the manifest 1038 operating as an active server page 1000 are passed to the host application operating the user's document at the user's computer 20. At block 1160, the user's document is opened with the solution applied to the document.

Referring back to block 1125, if the document refers to a document solution or namespace which is not located at the user's local schema library 105, and the document does not point to a manifest, the method proceeds to block 1130 and the manifest collection 1040 is called using the URL set for the user's computer 20. At block 1135, a determination is made as to whether the namespace associated with the user's document matches a namespace/solution pair 1055 contained in the manifest collection 1040. If no match is obtained, the method proceeds to block 1140 and the document is opened without the benefit of a document solution. On the other hand, if a matching namespace/solution pair is located in the manifest collection 1040, the solution ID and location information is utilized for calling a particular manifest 1038 where the solution components may be obtained. The method then proceeds to block 1145 for obtaining the document solution, as described above. Alternatively, if the document does not point to a manifest nor refer to a namespace, a processing instruction may be used to point the document to the manifest 1038 or to the manifest collection as discussed below. As is appreciated by those skilled in the art, a processing instruction allows a user to cause the document to reference a manifest or the manifest collection where the document does not point to the manifest or where the document does not refer to a namespace.

Referring back to block 1115, as should be appreciated, even if it is determined that a referenced document solution or namespace is located at the user's local schema library 105, according to an alternate embodiment, a call may nonetheless be made to one or both of the manifest 1038 or manifest collection 1040 for determining whether any updates to the document solution contained in the user's local schema library 105 have been made. If updates have been made, the updated solutions may be obtained, as described herein for updating the solution contained in the user's local schema library 105.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

Sample Manifest Schema

```
<xsd:schema xmlns:xsd="http://www.w3.org/2001/XMLSchema" xmlns="urn:schemas-microsoft-com:smartdocuments:manifest"
        targetNamespace="urn:schemas-microsoft-com:smartdocuments:manifest" elementFormDefault="qualified">
    <xsd:annotation>
      <xsd:documentation xml:lang="en">
          The schema for office smart document, transform and schema manifests.
      </xsd:documentation>
    </xsd:annotation>
    <xsd:element name="manifest" type="manifestType" />
    <xsd:complexType name="manifestType" mixed="true">
        <xsd:sequence>
            <xsd:element name="version" type="xsd:string" />
            <xsd:element name="location" type="xsd:string" />
            <xsd:element name="updateFrequency" type="zeroAndPositiveInteger" minOccurs="0" maxOccurs="1"/>
            <xsd:element name="uri" type="xsd:string" />
            <xsd:element name="manifestURL" type="xsd:string" minOccurs="0" maxOccurs="1" />
            <xsd:element name="solution" type="solutionDefn" minOccurs="1" maxOccurs="unbounded" />
        </xsd:sequence>
    </xsd:complexType>
    <xsd:complexType name="solutionDefn">
        <xsd:sequence>
            <xsd:element name="solutionID" type="xsd:string" />
            <xsd:element name="type" type="solutionType" />
            <xsd:element name="alias">
                <xsd:complexType>
                    <xsd:simpleContent>
                        <xsd:extension base="xsd:string">
                            <xsd:attribute name="lcid" type="xsd:string" use="required"/>
                        </xsd:extension>
                    </xsd:simpleContent>
                </xsd:complexType>
            </xsd:element>
            <xsd:element name="solutionSpecific" type="xsd:string" minOccurs="0" maxOccurs="1" />
            <xsd:element name="file"    type="fileType"    minOccurs="1" maxOccurs="unbounded"/>
        </xsd:sequence>
    </xsd:complexType>
    <xsd:simpleType name="solutionType">
       <xsd:restriction base="xsd:string">
            <xsd:enumeration value="schema" />
            <xsd:enumeration value="transform" />
            <xsd:enumeration value="smartDocument" />
       </xsd:restriction>
    </xsd:simpleType>
    <xsd:complexType name="fileType">
       <xsd:all>
            <xsd:element name="runFromServer" type="xsd:string" minOccurs="0" maxOccurs="1"/>
                <xsd:element name="type" type="typeDefn" />
                <xsd:element name="application" type="xsd:string" minOccurs="0" maxOccurs="1" />
                <xsd:element name="version" type="xsd:string" />
```

-continued

Sample Manifest Schema

```
            <xsd:element name="context" type="xsd:string" minOccurs="0" maxOccurs="1" />
            <xsd:element name="filePath" type="xsd:string" />
            <xsd:element name="installPath" type="xsd:string" minOccurs="0" maxOccurs="1" />
            <xsd:element name="register" type="xsd:string" minOccurs="0" maxOccurs="1" />
            <xsd:element name="CLSID" type="xsd:string" minOccurs="0" maxOccurs="1" />
            <xsd:element name="progID" type="xsd:string" minOccurs="0" maxOccurs="1" />
            <xsd:element name="regsvr32" type="xsd:string" minOccurs="0" maxOccurs="1" />
            <xsd:element name="regasm" type="xsd:string" minOccurs="0" maxOccurs="1" />
            <xsd:element name="registry" type="registryType" minOccurs="0" maxOccurs="1"/>
        </xsd:all>
    </xsd:complexType>
    <xsd:simpleType name="typeDefn">
        <xsd:restriction base="xsd:string">
            <xsd:enumeration value="template" />
            <xsd:enumeration value="smartTagList" />
            <xsd:enumeration value="solutionList" />
            <xsd:enumeration value="schema" />
            <xsd:enumeration value="transform" />
            <xsd:enumeration value="actionHandler" />
            <xsd:enumeration value="solutionActionHandler" />
            <xsd:enumeration value="recognizer" />
            <xsd:enumeration value="solutionRecognizer" />
            <xsd:enumeration value="solutionList" />
            <xsd:enumeration value="COMAddIn" />
            <xsd:enumeration value="assembly" />
            <xsd:enumeration value="XMLFile" />
            <xsd:enumeration value="installPackage" />
        </xsd:restriction>
    </xsd:simpleType>
    <xsd:complexType name="registryType">
        <xsd:all>
            <xsd:element name="registryKey" type="registryKeyType" minOccurs="1" />
        </xsd:all>
    </xsd:complexType>
    <xsd:complexType name="registryKeyType">
        <xsd:all>
            <xsd:element name="keyName" type="xsd:string" />
            <xsd:element name="keyValue" type="keyValueType" />
        </xsd:all>
    </xsd:complexType>
    <xsd:complexType name="keyValueType">
        <xsd:all>
            <xsd:element name="valueName" type="xsd string" />
            <xsd:element name="valueType" type="registryValueType" />
            <xsd:element name="value" type="xsd:string" />
        </xsd:all>
    </xsd:complexType>
    <xsd:simpleType name="registryValueType">
      <xsd:restriction base="xsd:string">
            <xsd:enumeration value="REG_SZ" />
            <xsd:enumeration value="REG_EXPAND_SZ" />
            <xsd:enumeration value="REG_DWORD" />
        </xsd:restriction>
    </xsd:simpleType>
    <xsd:simpleType name="zeroAndPositiveInteger">
        <xsd:restriction base="xsd:integer">
            <xsd:minInclusive value="0"/>
        </xsd:restriction>
    </xsd:simpleType>
</xsd:schema>
```

We claim:

1. A method of downloading software components from a remote source to a software application for providing updates or additions to application or document functionality, comprising:

attaching a schema to a document defining permissible data content, data type and data structure for the document;

structuring the document to associate the document with the schema by annotating particular portions of the document with elements of the schema;

associating a document solution with the document structure, wherein at least one solution is associated with each element of the schema annotating the particular portions of the document, and wherein the document solution includes at least one from a set of a plurality of information tips to assist a user of the document and a plurality of document actions;

in response to initiation of editing of a particular portion of the document annotated with a schema element, calling on the document solution associated with the schema element;

determining whether the document solution associated with the schema element is present in a local library of software components;

if the document solution is not present in the local library of software components, assembling a plurality of software components comprising a plurality of document solutions at a location remote from the document;

if the document solution is present in the local library of software components, determining whether the document solution requires updating, and if the document solution requires updating, assembling the plurality of software components comprising the plurality of document solutions at the location remote from the document;

obtaining profile information associated with a user of the document, the profile information including at least one from a set of: a job description, a location, and a security clearance;

generating a document solution tailored to the profile information associated with the user of the document; and downloading the tailored document solution to the application for provision of functionality provided by the tailored document solution to the document.

2. The method of claim 1, wherein assembling the plurality of software components includes assembling the plurality of software components comprising the plurality of document solutions in a manifest of document solutions; and wherein prior to obtaining profile information associated with a user of the document, calling the manifest to request the tailored document solution, and passing an identification of the user of the document to the manifest with the request for the tailored document.

3. The method of claim 2, wherein in response to the identification of the user of the document, calling a user information database from the manifest to obtain profile information associated with the user of the document; and wherein generating a document solution tailored to the profile information associated with the user of the document includes selecting at least one document solution component from a plurality of document solution components based on the profile information.

4. The method of claim 3, prior to downloading the software components to the application, further comprising:

if the plurality of software components is not present in the local library of software components, calling the manifest for obtaining the document solution.

5. A method of downloading software components from a remote source to a software application for providing a desired solution to a computer-generated document, comprising:

obtaining the computer-generated document;

determining whether the computer-generated document references a document solution associated with a schema element annotating a particular portion of the computer-generated document, wherein the schema element is part of a schema attached to the computer-generated document for defining permissible data content, data type, and data structure for the computer-generated document, and wherein the document solution includes at least one from a set of a plurality of information tips to assist a user of the computer-generated document and a plurality of document actions;

if the computer-generated document references a document solution, determining whether the referenced document solution is present in a local library of software components;

if the document solution is not present in the local library of software components, calling a manifest of document solutions for the document solution, wherein the manifest of document solutions includes another attached schema for associating the manifest of document solutions with a file, a document, and an application enabled to call the manifest of document solutions for downloading required components of the document solution;

if the document solution is present in the local library of software components determining whether the document solution requires an update, and if the document solution requires an update, calling the manifest of document solutions for the document solution;

passing an identification of a user of the computer-generated document to the manifest of document solutions;

at the manifest, calling a database of user information with the identification of the user for obtaining profile information for the user of the computer-generated document, the profile information including at least one from a set of: a job description, a location, and a security clearance;

obtaining profile information associated with the user of the computer-generated document;

at the manifest, generating a tailored document solution with the required components customized for the profile information associated with the user of the computer-generated document; and downloading the tailored document solution to the application for provision of functionality provided by the tailored document solution to the computer-generated document.

6. The method of claim 5, wherein if the computer-generated document does not reference a document solution, determining whether the computer-generated document references a namespace associated with structure applied to the computer-generated document;

if the computer-generated document references a namespace, calling a manifest collection, and determining whether the manifest collection contains a document solution identification associated with the referenced namespace;

if the manifest collection contains a document solution identification associated with the referenced namespace, obtaining a location of the document solution identified by the document solution identification;

calling the location of the document solution identified by the document solution identification; and downloading the document solution identified by the document solution identification to the computer-generated document.

7. A method of downloading software components from a remote source to a software application for providing a desired solution to a computer-generated document, comprising:

obtaining the computer-generated document, wherein a schema is attached to the computer-generated document defining permissible data content, data type and data structure for the computer-generated document, and wherein the schema includes schema elements annotating particular portions of the computer-generated document;

determining whether the computer-generated document references a document namespace;

if the computer-generated document references a document namespace, determining whether a manifest collection contains a document solution identification associated with the document namespace identified by one of the schema elements;

if the manifest collection contains a document solution identification associated with the document namespace, obtaining a location of the document solution identified by the document solution identification, wherein the document solution includes at least one from a set of a plurality of information tips to assist a user of the computer-generated document and a plurality of document actions;

if the location includes a local library of software components in addition to the remote source, determining whether the document solution in the local library of software components requires an update, and if the document solution requires an update, calling the remote source location of the document solution identified by the document solution identification;

if the location does not include the local library of software components, calling the location of the document solution identified by the document solution identification;

passing an identification of a user of the computer-generated document to the manifest of document solutions identified by the document solution identification as the location of the document solution;

at the manifest of document solutions, calling a database of user information with the identification of the user for obtaining profile information for the user of the computer-generated document, the profile information including at least one from a set of: a job description, a location, and a security clearance;

obtaining the profile information associated for the user of the computer-generated document;

at the manifest of document solutions, generating a document solution tailored to the profile information associated with the user of the computer-generated document; and downloading the tailored document solution identified by the document solution identification to the computer-generated document for providing the functionality of the tailored document solution to the computer-generated document.

8. A computer-readable medium with computer executable instructions stored thereon, which when executed by a computer perform a method of downloading software components from a remote source to a software application for providing updates or additions to application or document functionality, the method comprising:

attaching a schema to a document defining permissible data content, data type and data structure for the document;

structuring the document to associate the document with the schema by annotating particular portions of the document with elements of the schema;

associating a document solution with the document structure, wherein at least one solution is associated with each element of the schema annotating the particular portions of the document, and wherein the document solution includes at least one from a set of a plurality of information tips to assist a user of the document and a plurality of document actions;

in response to initiation of editing of a particular portion of the document annotated with a schema element, calling on the document solution associated with the schema element;

determining whether the document solution associated with the schema element is present in a local library of software components;

if the document solution is not present in the local library of software components, assembling a plurality of software components comprising a plurality of document solutions at a location remote from the document;

if the document solution is present in the local library of software components, determining whether the document solution requires updating, and if the document solution requires updating, assembling the plurality of software components comprising the plurality of document solutions at the location remote from the document;

obtaining profile information associated with a user of the document, the profile information including at least one from a set of: a job description, a location, and a security clearance;

generating the document solution tailored to the profile information associated with the user of the document; and downloading the tailored document solution to the application for provision of functionality provided by the tailored document solution to the document.

9. The computer-readable medium of claim 8, wherein assembling the plurality of software components includes assembling the plurality of software components comprising one or more document solutions in a manifest of document solutions; and wherein prior to obtaining profile information associated with a user of the document, calling the manifest to request the tailored document solution, and passing an identification of the user of the document to the manifest with the request for the tailored document.

10. The computer-readable medium of claim 9, wherein in response to the identification of the user of the document, calling a user information database from the manifest to obtain profile information associated with the user of the document; and wherein generating a document solution tailored to the profile information associated with the user of the document includes selecting one or more document solution components from a plurality of document solution components based on the profile information.

11. The computer-readable medium of claim 10, prior to downloading the software components to the application, further comprising:

if the plurality of software components is not present in the local library of software components, calling the manifest for obtaining the document solution.

12. The computer-readable medium of claim 11, wherein the manifest is an Active Server Page operative to call the user information database to obtain the profile information for the user of the document and to generate the tailored document solution by selecting one or more document solution components from a plurality of document solution components based on the profile information.

13. A computer-readable medium with computer executable instructions stored thereon, which when executed by a computer perform a method of downloading software components from a remote source to a software application for providing a desired solution to a computer-generated document, comprising:

obtaining the computer-generated document, wherein a schema is attached to the computer-generated document defining permissible data content, data type and data structure for the computer-generated document, and wherein the schema includes schema elements annotating particular portions of the computer-generated document;

determining whether the computer-generated document references a document namespace;

if the computer-generated document references a document namespace, determining whether a manifest collection contains a document solution identification associated with the document namespace identified by one of the schema elements;

if the manifest collection contains a document solution identification associated with the document namespace, obtaining a location of the document solution identified by the document solution identification, wherein the document solution includes at least one from a set of a plurality of information tips to assist a user of the computer-generated document and a plurality of document actions;

if the location includes a local library of software components in addition to the remote source, determining whether the document solution in the local library of software components requires an update, and if the document solution requires an update, calling the remote source location of the document solution identified by the document solution identification;

if the location does not include the local library of software components, calling the location of the document solution identified by the document solution identification;

passing an identification of a user of the computer-generated document to the manifest of document solutions identified by the document solution identification as the location of the document solution;

at the manifest of document solutions, calling a database of user information with the identification of the user for obtaining profile information for the user of the computer-generated document, the profile information including at least one from a set of: a job description, a location, and a security clearance;

obtaining the profile information associated for the user of the computer-generated document;

at the manifest of document solutions, generating a document solution tailored to the profile information associated with the user of the computer-generated document; and downloading the tailored document solution identified by the document solution identification to the computer-generated document for providing the functionality of the tailored document solution to the computer-generated document.

* * * * *

UNITED STATES PATENT AND TRADEMARK OFFICE
CERTIFICATE OF CORRECTION

| | | |
|---|---|---|
| PATENT NO. | : 7,827,546 B1 | Page 1 of 1 |
| APPLICATION NO. | : 10/731899 | |
| DATED | : November 2, 2010 | |
| INVENTOR(S) | : Brian Jones et al. | |

It is certified that error appears in the above-identified patent and that said Letters Patent is hereby corrected as shown below:

In column 4, line 46, delete "documents.""" and insert -- documents," --, therefor.

In column 20, line 33, in Claim 5, delete "components" and insert -- components, --, therefor.

Signed and Sealed this
Nineteenth Day of July, 2011

David J. Kappos
*Director of the United States Patent and Trademark Office*